US010726262B2

(12) United States Patent
Yamagishi et al.

(10) Patent No.: US 10,726,262 B2
(45) Date of Patent: Jul. 28, 2020

(54) IMAGING SUPPORT SYSTEM, DEVICE AND METHOD, AND IMAGING TERMINAL

(71) Applicant: FUJIFILM Corporation, Tokyo (JP)

(72) Inventors: Hideki Yamagishi, Tokyo (JP); Satoshi Kubota, Tokyo (JP); Masayuki Negoro, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 196 days.

(21) Appl. No.: 15/916,415

(22) Filed: Mar. 9, 2018

(65) Prior Publication Data

US 2018/0197006 A1 Jul. 12, 2018

Related U.S. Application Data

(63) Continuation of application No. PCT/JP2016/076730, filed on Sep. 12, 2016.

(30) Foreign Application Priority Data

Sep. 25, 2015 (JP) ................................ 2015-188538

(51) Int. Cl.
*G06K 9/00* (2006.01)
*G06T 7/70* (2017.01)
(Continued)

(52) U.S. Cl.
CPC ......... *G06K 9/00637* (2013.01); *G03B 15/00* (2013.01); *G06Q 10/20* (2013.01);
(Continued)

(58) Field of Classification Search
CPC .... G06K 9/00637; G03B 15/00; G06Q 10/20; G06Q 50/08; G06T 7/70; G06T 2207/30244
See application file for complete search history.

(56) References Cited

U.S. PATENT DOCUMENTS

2009/0096875 A1  4/2009  Yoshimaru et al.
2010/0306117 A1* 12/2010  Terayoko ............... G06Q 10/00
                                                        705/313
(Continued)

FOREIGN PATENT DOCUMENTS

JP   2007-280282 A   10/2007
JP   2013-125535 A    6/2013
(Continued)

OTHER PUBLICATIONS

An Office Action mailed by the European Patent Office dated Feb. 27, 2019, which corresponds to European Patent Application No. 16848523.3 and is related to U.S. Appl. No. 15/916,415.
(Continued)

*Primary Examiner* — David F Dunphy
(74) *Attorney, Agent, or Firm* — Studebaker & Brackett PC

(57) ABSTRACT

Specifying information for specifying a surrounding inspection target which is an inspection target present in a predetermined range with respect to the imaging terminal is acquired from the imaging terminal. The surrounding inspection target is specified among the plurality of inspection targets on the basis of the specifying information. It is evaluated whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target. Image acquisition area information indicating the image acquisition area in which the acquisition of a new captured image is evaluated to be necessary is output to the imaging terminal.

10 Claims, 16 Drawing Sheets

(51) Int. Cl.
  *G06Q 50/08* (2012.01)
  *H04N 5/225* (2006.01)
  *G03B 15/00* (2006.01)
  *G06Q 10/00* (2012.01)

(52) U.S. Cl.
  CPC .............. *G06Q 50/08* (2013.01); *G06T 7/70* (2017.01); *H04N 5/225* (2013.01); *G06T 2207/30244* (2013.01)

(56) References Cited

U.S. PATENT DOCUMENTS

| | | | |
|---|---|---|---|
| 2011/0050888 A1 | 3/2011 | Shibukawa et al. | |
| 2012/0069233 A1 | 3/2012 | Nonaka et al. | |
| 2013/0272569 A1 | 10/2013 | Yumbe et al. | |
| 2018/0189705 A1* | 7/2018 | Nonaka | G06T 7/97 |
| 2018/0189749 A1* | 7/2018 | Takamori | G01M 99/00 |

FOREIGN PATENT DOCUMENTS

| | | |
|---|---|---|
| JP | 2013-164786 A | 8/2013 |
| JP | 2015-019270 A | 1/2015 |

OTHER PUBLICATIONS

International Search Report issued in PCT/JP2016/076730; dated Nov. 29, 2016.
International Preliminary Report on Patentability issued in PCT/JP2016/076730; dated Jun. 1, 2017.
Written Opinion issued in PCT/JP2016/076730; dated Nov. 29, 2016.
"ChibaRepo ~ New Communication Tool Connecting Citizen to Administration ~ (Chiba-prefecture, Chiba-city)", [online], [Searched on Aug. 31, 2015], Internet <http://www.applic.or.jp/pdf/futuer_18/04/10.pdf>.
The extended European search report issued by the European Patent Office dated Jun. 28, 2018, which corresponds to EP16848523.3-1222 and is related to U.S. Appl. No. 15/916,415.
An Office Action mailed by the State Intellectual Property Office of the People's Republic of China dated Oct. 11, 2019, which corresponds to Chinese Patent Application No. CN201680054656.9 and is related to U.S. Appl. No. 15/916,415.
An Office Action mailed by the European Patent Office dated Mar. 13, 2020, which corresponds to European Patent Application No. 16848523.3-1222 and is related to U.S. Appl. No. 15/916,415.

* cited by examiner

IMAGING SUPPORT SYSTEM, DEVICE AND METHOD, AND IMAGING TERMINAL

CROSS-REFERENCE TO RELATED APPLICATIONS

This application is a Continuation of PCT International Application No. PCT/JP2016/076730 filed on Sep. 12, 2016, which claims priority under 35 U.S.C § 119(a) to Japanese Patent Application No. 2015-188538 filed on Sep. 25, 2015. Each of the above application(s) is hereby expressly incorporated by reference, in its entirety, into the present application.

BACKGROUND OF THE INVENTION

1. Field of the Invention

The present invention relates to an imaging support system, an imaging support device, an imaging support method which support imaging of an inspection target using an imaging terminal, and an imaging terminal that is used in the imaging support system.

2. Description of the Related Art

Inspection of various buildings (referred to as a building, a structure, a construction, or an infrastructure; an inspection target) such as a bridge; a road, a tunnel, a dam, an embankment, or a building is conducted by an expert with expertise. The expert images an inspection point of the building using various imaging terminals such as a smartphone, a tablet terminal, or a digital camera. Captured image data obtained by this imaging is registered in a database for building management and used for management (maintenance and inspection, inspection management, or maintenance management) of the building.

JP2013-164786A discloses an imaging support device that outputs information on an inspection point not imaged by an imaging terminal to the imaging terminal by specifying a building that is an imaging target on the basis of position information acquired from the imaging terminal and then specifying an inspection point of the building by referring to an inspection reference of the building. Accordingly, captured image data of inspection points of various buildings can be acquired without omission and registered in a database for building management.

In recent years, since the number of buildings that are inspection targets with respect to the number of experts has greatly increased, it is not possible for experts to sufficiently perform inspection of the buildings. Therefore, in recent years, efforts have been performed to acquire captured image data of buildings from ordinary persons and register the captured image data in a database for building management (see "ChibaRepo~New Communication Tool Connecting Citizen to Administration~(Chiba-prefecture, Chiba-city)", [online], [Searched on Aug. 31, 2015], Internet <http://www.applic.or.jp/pdf/futuer_18/04/10.pdf>.

SUMMARY OF THE INVENTION

Incidentally, "ChibaRepo~New Communication Tool Connecting Citizen to Administration~(Chiba-prefecture, Chiba-city)", [online], [Searched on Aug. 31, 2015], Internet <http://www.applic.or.jp/pdf/futuer_18/04/10.pdf> describes acquiring captured image data of a building from an ordinary person, but an ordinary person who does not have expertise regarding inspection of the building does not normally recognize a building of which inspection (imaging) is necessary or a point of the building of which the inspection (imaging) is necessary. Therefore, captured image data of the building of which imaging is necessary may not be obtained from the ordinary person at all.

The present invention has been made in view of such circumstances, and an object of the present invention is to provide an imaging support system, device, and method capable of efficiently acquiring a captured image of an inspection target of which imaging is necessary from an ordinary person, and an imaging terminal that is used in this imaging support system.

An imaging support system for achieving the object of the present invention is an imaging support system comprising an imaging terminal having an imaging unit, and an imaging support device that supports imaging of an inspection target in the imaging terminal, wherein the imaging support device comprises: a specifying information acquisition unit that acquires, from the imaging terminal, specifying information for specifying a surrounding inspection target which is an inspection target present in a predetermined range with respect to the imaging terminal; an inspection target specifying unit that specifies the surrounding inspection target among the plurality of inspection targets on the basis of the specifying information acquired by the specifying information acquisition unit; a necessity evaluation unit that evaluates whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target specified by the inspection target specifying unit; and an image acquisition area information output unit that outputs image acquisition area information indicating the image acquisition area in which the necessity evaluation unit evaluates that the acquisition of a new captured image is necessary to the imaging terminal; and wherein the imaging terminal comprises: a position information acquisition unit that acquires a position information of an imaging terminal; a specifying information output unit that outputs the specifying information which include the position information of the imaging terminal acquired by the position information acquisition unit to the specifying information acquisition unit; and a display unit that displays the image acquisition area on the basis of the image acquisition area information output from the image acquisition area information output unit; and wherein the inspection target specifying unit acquires the position information of the inspection target indicating positions of the plurality of inspection targets, and specifies the surrounding inspection target on the basis of the inspection target information and the position information of the imaging terminal included in the specifying information acquired by the specifying information acquisition unit.

According to this imaging support system, it is possible to request a user of the imaging terminal to image the image acquisition area in which acquisition of a new captured image is necessary.

In the imaging support system according to another aspect of the present invention, the imaging terminal comprises a position information acquisition unit that acquires position information of the imaging terminal, the specifying information includes the position information acquired by the position information acquisition unit, and the inspection target specifying unit acquires map information indicating positions of the plurality of inspection targets, and specifies the surrounding inspection target on the basis of the map information and the position information included in the specifying information acquired by the specifying information acquisition unit. Thus, it is possible to specify the surrounding inspection target from the position information that is acquired in the imaging terminal.

In the imaging support system according to yet another aspect of the present invention, the imaging terminal comprises an imaging direction acquisition unit that acquires an imaging direction of the imaging terminal, the specifying information further includes the imaging direction acquired by the imaging direction acquisition unit, the inspection target specifying unit specifies the surrounding inspection target included in an imaging range of the imaging unit on the basis of the position information and the imaging direction included in the specifying information acquired by the specifying information acquisition unit, the necessity evaluation unit evaluates whether or not there is the image acquisition area in the imaging range of the imaging unit on the basis of a specifying result of the inspection target specifying unit, the image acquisition area information output unit outputs the image acquisition area information indicating the image acquisition area in the imaging range to the imaging terminal, and the display unit discriminably displays the image acquisition area on the basis of the image acquisition area information in a case where a live view image is displayed on the basis of the captured image obtained by imaging in the imaging unit. Accordingly, it is possible to request a user of the imaging terminal to image the image acquisition area in which acquisition of a new captured image is necessary.

In the imaging support system according to yet another aspect of the present invention, the inspection target is a building, the imaging terminal comprises an imaging direction acquisition unit that acquires an imaging direction of the imaging terminal, the specifying information further includes the imaging direction acquired by the imaging direction acquisition unit, the imaging support device includes a design information specifying unit that acquires design information of the plurality of inspection targets in advance and specifies the design information of the surrounding inspection target on the basis of the design information and the surrounding inspection target specified by the inspection target specifying unit, the inspection target specifying unit further specifies a part of the surrounding inspection target in the imaging range of the imaging unit on the basis of the position information and the imaging direction included in the specifying information acquired by the specifying information acquisition unit, and the design information specified by the design information specifying unit, and the necessity evaluation unit evaluates whether or not there is the image acquisition area in the part specified by the inspection target specifying unit on the basis of a result of accessing the database and referring to the maintenance and inspection information of the surrounding inspection target. Accordingly, since the display of the image acquisition area in the imaging terminal can be performed in parts of the surrounding inspection target in the imaging range, the user of the imaging terminal can easily discriminate which part of the surrounding inspection target in the imaging range may be imaged.

In the imaging support system according to yet another aspect of the present invention, the inspection target is a building, the specifying information further includes a captured image obtained by imaging in the imaging unit, the imaging support device includes a design information specifying unit that acquires design information of the plurality of inspection targets in advance and specifies the design information of the surrounding inspection target on the basis of the design information and the surrounding inspection target specified by the inspection target specifying unit, the inspection target specifying unit further specifies a part of the surrounding inspection target in the imaging range of the imaging unit on the basis of the position information and the captured image included in the specifying information acquired by the specifying information acquisition unit, and the design information specified by the design information specifying unit, and the necessity evaluation unit evaluates whether or not there is the image acquisition area in the part specified by the inspection target specifying unit on the basis of a result of accessing the database and referring to the maintenance and inspection information of the surrounding inspection target. Accordingly, since the display of the image acquisition area in the imaging terminal can be performed in parts of the surrounding inspection target in the imaging range, the user of the imaging terminal can easily discriminate which part of the surrounding inspection target in the imaging range may be imaged.

In the imaging support system according to yet another aspect of the present invention, the image acquisition area information output unit outputs the image acquisition area information indicating the image acquisition area in the imaging range in which it is evaluated by the necessity evaluation unit that acquisition of a new captured image is necessary, to the imaging terminal, and the display unit discriminably displays the image acquisition area on the basis of the image acquisition area information in a case where a live view image is displayed on the basis of the captured image obtained by imaging in the imaging unit. Accordingly, it is possible to request a user of the imaging terminal to image the image acquisition area in which acquisition of a new captured image is necessary.

In the imaging support system according to yet another aspect of the present invention, the image acquisition area information includes information capable of specifying a position of the image acquisition area on a map, and the display unit displays an image acquisition area display map indicating a position of the image acquisition area on the map on the basis of the image acquisition area information output from the image acquisition area information output unit. Accordingly, it is possible to request a user of the imaging terminal to image the image acquisition area in which acquisition of a new captured image is necessary.

In the imaging support system according to yet another aspect of the present invention, the imaging terminal comprises an image output unit that outputs the captured image of the image acquisition area to the imaging support device in a case where the imaging unit images the image acquisition area, and the imaging support device comprises a database management unit that registers the captured image output from the image output unit in the database as the maintenance and inspection information of the surrounding inspection target corresponding to the image acquisition area. Accordingly, the captured image captured by the imaging terminal of the ordinary person can be registered in the database as the maintenance and inspection information of the surrounding inspection target.

In the imaging support system according to yet another aspect of the present invention, in a case where the captured image output from the image output unit of the imaging terminal of a predetermined specific user is registered in the database, the database management unit erases the captured image previously registered in the database as the maintenance and inspection information of the surrounding inspection target, the captured image being acquired from the imaging terminal of a user different from the specific user. Accordingly, the amount of data registered in the database can be reduced.

An imaging support device for achieving the object of the present invention comprises: a specifying information acquisition unit that acquires, from an imaging terminal, specifying information which include the position information of the imaging terminal for specifying a surrounding inspection target which is an inspection target present in a predetermined range with respect to the imaging terminal; an inspection target specifying unit that specifies the surrounding inspection target among the plurality of inspection targets on the basis of the specifying information which include the position information of the imaging terminal acquired by the specifying information acquisition unit and the position information of the inspection target indicating positions of the plurality of inspection targets; a necessity evaluation unit that evaluates whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target specified by the inspection target specifying unit; and an image acquisition area information output unit that outputs image acquisition area information indicating the image acquisition area in which the necessity evaluation unit evaluates that the acquisition of a new captured image is necessary to the imaging terminal.

An imaging terminal for achieving the object of the present invention constitutes any one of the imaging support systems described above.

An imaging support method for achieving the object of the present invention is an imaging support method that supports imaging of an inspection target in an imaging terminal including an imaging unit by using an imaging support device, the imaging support method comprising: a specifying information acquisition step of acquiring, by the imaging support device, specifying information which include the position information of the imaging terminal for specifying a surrounding inspection target which is an inspection target present in a predetermined range with respect to the imaging terminal from the imaging terminal; an inspection target specifying step of acquiring a position information of the inspection target indicating positions of the plurality of inspection targets and specifying, by the imaging support device, the surrounding inspection target among the plurality of inspection targets on the basis of the specifying information which include the position information of the imaging terminal acquired in the specifying information acquisition step and the position information of the inspection target; a necessity evaluation step of evaluating, by the imaging support device, whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target specified in the inspection target specifying step; an image acquisition area information output step of outputting, by the imaging support device, image acquisition area information indicating the image acquisition area in which it is evaluated in the necessity evaluation step that the acquisition of a new captured image is necessary, to the imaging terminal; and a display step of displaying, by the imaging terminal, the image acquisition area on the display unit on the basis of the image acquisition area information acquired from the imaging support device in the image acquisition area information output step.

The imaging support system, device and method, and the imaging terminal of the present invention can efficiently acquire a captured image of an inspection target of which imaging is necessary from an ordinary person.

DESCRIPTION OF THE PREFERRED EMBODIMENTS

Figure 1:
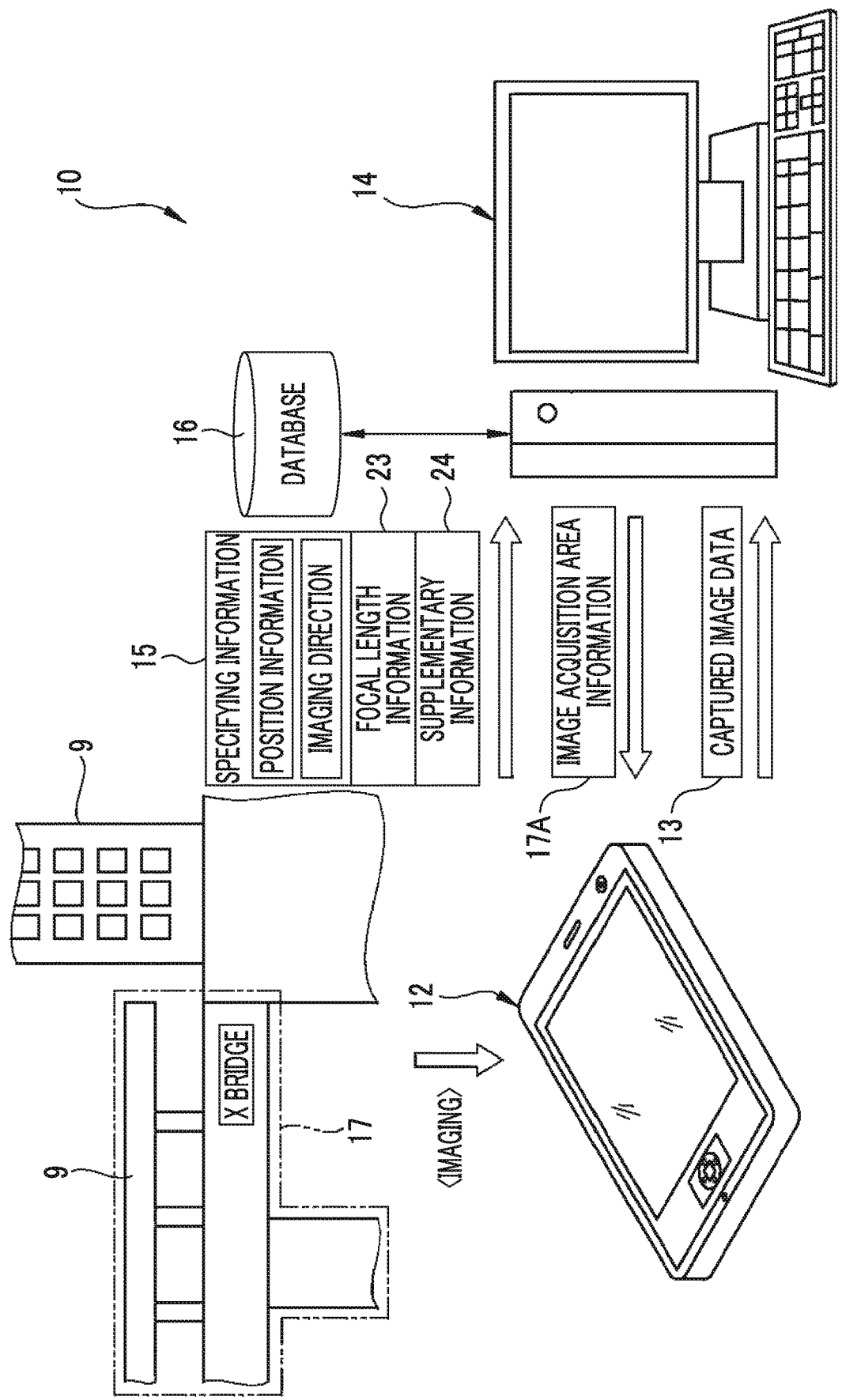
FIG. 1 is a schematic diagram of an imaging support system of a first embodiment.

FIG. 1 is a schematic diagram of an imaging support system 10 of a first embodiment of the present invention. As illustrated in FIG. 1, in the imaging support system 10, captured image data 13 of a surrounding building 9 of which imaging is necessary among surrounding buildings 9 which are buildings present within a predetermined range around an imaging terminal 12 is acquired from the imaging terminal 12 owned by an ordinary person. The building is a building corresponding to an inspection target of the present invention (an object that can be an inspection and management target), and includes a bridge, a road, a tunnel, a dam, an embankment, a building, and the like. Further, the surrounding building 9 corresponds to a surrounding inspection target of the present invention. Further, an ordinary person refers to a person who does not have expertise regarding inspection of the building. This imaging support system 10 includes an imaging terminal 12 and an imaging support device 14.

The imaging support device 14 acquires specifying information 15 that can specify the surrounding building 9 from the imaging terminal 12 and specifies the surrounding building 9. Then, the imaging support device 14 evaluates whether or not there is the image acquisition area 17 in which acquisition of new captured image data 13 is necessary for the previously specified surrounding building 9 by referring to a database 16 storing maintenance and inspection information 38 (see FIG. 2) of a plurality of buildings (including objects other than the surrounding building 9). In a case where the imaging support device 14 evaluates that there is the image acquisition area 17, the imaging support device 14 outputs image acquisition area information 17A indicating the image acquisition area 17 to the imaging terminal 12. As such an imaging support device 14, for example, a personal computer, a server, or the like is suitably used.

In the present invention, the "terminal" means a device having information communication function (preferably, a wireless communication function). As the imaging terminal 12, for example, various portable terminals having an imaging function such as a smartphone, a tablet terminal, and a portable personal computer, or a digital camera having a communication function (preferably, a wireless communication function) are suitably used. The imaging terminal 12 outputs the above-described specifying information 15 to the imaging support device 14, and acquires and displays the image acquisition area information 17A that is output from the imaging support device 14 in response to the input of the specifying information 15, to request the user to image the image acquisition area 17. In a case where the imaging terminal 12 images the image acquisition area 17, the imaging terminal 12 generates captured image data 13 of the image acquisition area 17 and outputs the captured image data 13 to the imaging support device 14.

The specifying information 15 output from the imaging terminal 12 to the imaging support device 14 includes position information of the imaging terminal 12 and an imaging direction of the imaging terminal 12 (a direction of an imaging optical axis of the imaging terminal 12). The position information is acquired by a position information acquisition unit 20 (see FIG. 2), which will be described below, including a global positioning system (GPS) sensor, a gyro sensor, an acceleration sensor, or the like built in the imaging terminal 12. The imaging direction is a three-dimensional direction, and is acquired by an imaging direction acquisition unit 21 (see FIG. 2) including a three-dimensional geomagnetic sensor and a posture detection sensor built in the imaging terminal 12.

Further, in this example, the imaging terminal 12 outputs focal length information (angle of view information) 23 of an imaging unit 22 (see FIG. 2) of the imaging terminal 12, and supplementary information 24 together with the specifying information 15 to the imaging support device 14. Although will be described in detail below, the focal length information 23 is used for specifying of an imaging range R (see FIG. 3) of the imaging unit 22 of the imaging terminal 12. The supplementary information 24 is information for outputting (transmitting) the above-described image acquisition area information 17A from the imaging support device 14 to the imaging terminal 12, and is, for example, an Internet protocol address (IP address) of the imaging terminal 12.

Figure 2:
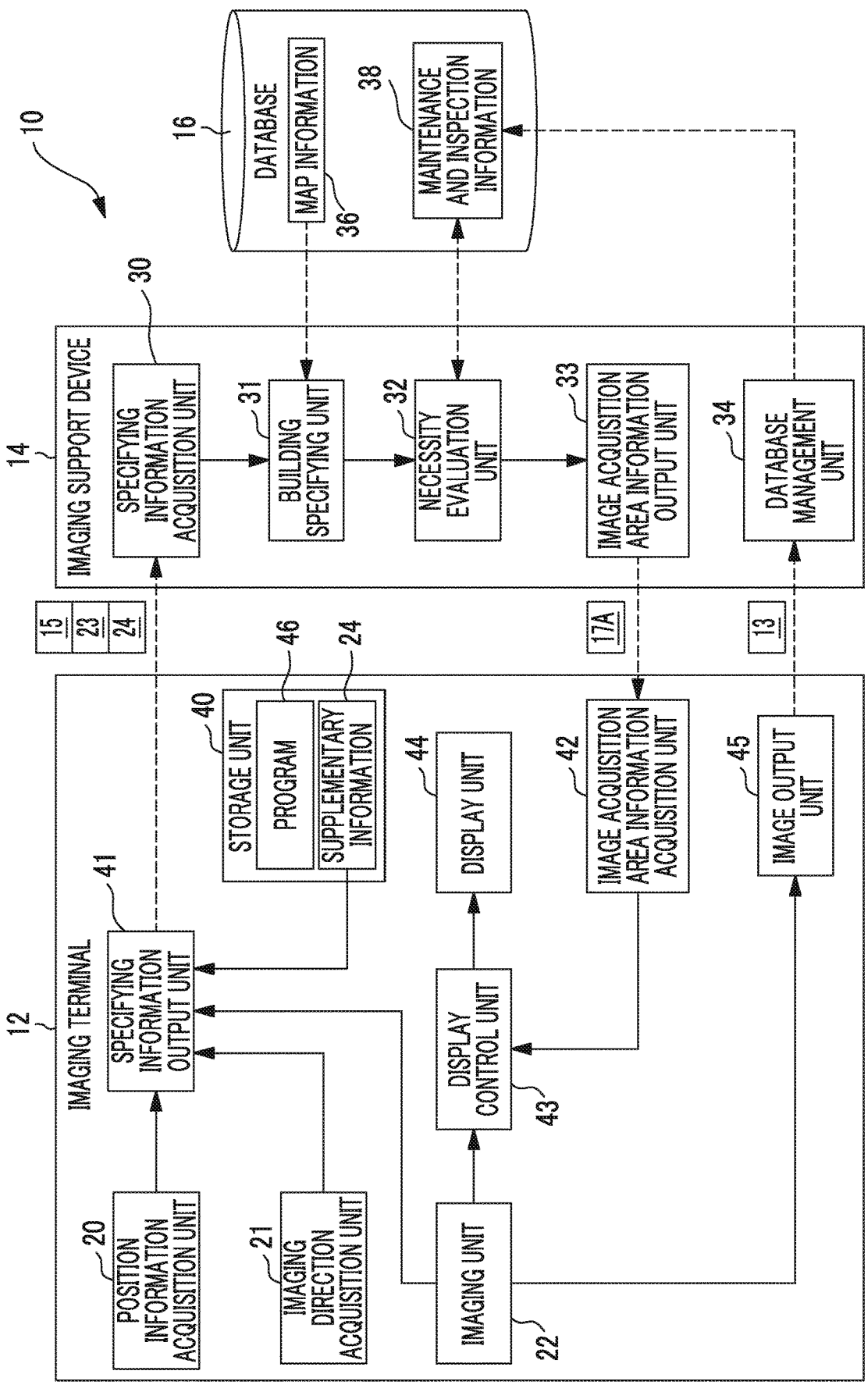
FIG. 2 is a block diagram illustrating a configuration of an imaging terminal and an imaging support device.

FIG. 2 is a block diagram illustrating configurations of the imaging terminal 12 and the imaging support device 14. First, the configuration of the imaging support device 14 will be described.

<Imaging Support Device>

As illustrated in FIG. 2, the imaging support device 14 is configured by various calculation units including a central processing unit (CPU), a processing unit, a storage unit, and the like, and includes a specifying information acquisition unit 30, a building specifying unit 31 corresponding to an inspection target specifying unit, a necessity evaluation unit 32, an image acquisition area information output unit 33, and a database management unit 34.

The specifying information acquisition unit 30 is, for example, a communication interface that can be communicatably connected to the imaging terminal 12 in a wired or wireless way and acquires the specifying information 15, the focal length information 23, and the supplementary information 24 from the imaging terminal 12. The specifying information acquisition unit 30 outputs the acquired specifying information 15 and the acquired focal length information 23 to the building specifying unit 31. Further, although not illustrated, the specifying information acquisition unit 30 outputs the acquired supplementary information 24 to the image acquisition area information output unit 33.

The building specifying unit 31 specifies the surrounding building 9 of the imaging terminal 12 on the basis of the position information included in the specifying information 15 input from the specifying information acquisition unit 30 and map information 36 acquired by accessing the database 16. Further, the building specifying unit 31 specifies the surrounding building 9 included in the imaging range R (see FIG. 3) of the imaging unit 22 of the imaging terminal 12 on the basis of the imaging direction and the focal length information 23 included in the specifying information 15.

Figure 3:
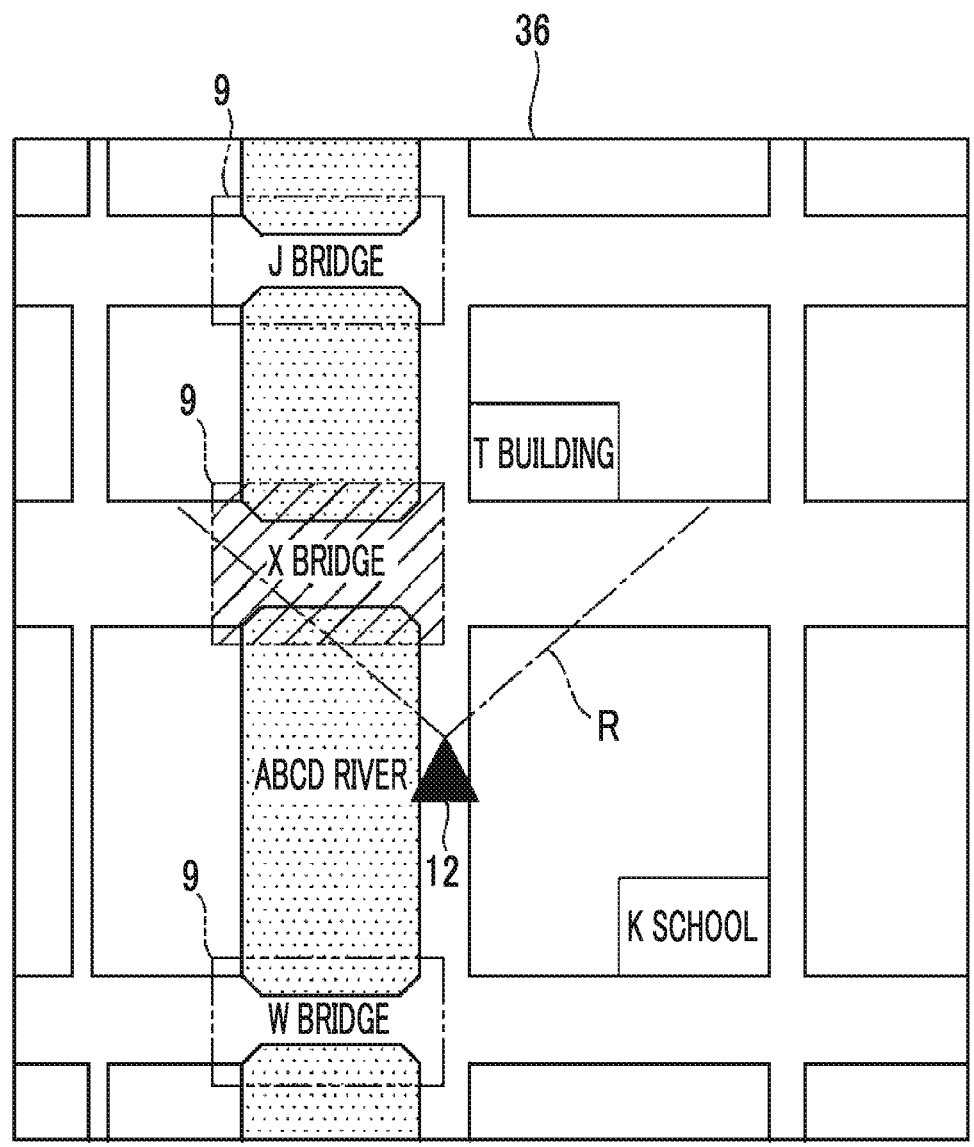
FIG. 3 is an illustrative diagram illustrating a process of specifying a surrounding building in a building specifying unit.

FIG. 3 is an illustrative diagram illustrating a process of specifying the surrounding building 9 in the building specifying unit 31. As illustrated in FIG. 3, the map information 36 indicates positions of a plurality of buildings (including the surrounding building 9) in a country in which the imaging support system 10 is used or in a region in which the imaging support system 10 is used, for example, GPS coordinates. Further, the map information 36 in this example is preferably three-dimensional map data so that a three-dimensional shape (solid shape) can be discriminated for each of a plurality of buildings from a plurality of directions. The map information 36 need not be stored in the database 16, but may be stored in a server on the Internet. In this case, the building specifying unit 31 accesses the server on the Internet to acquire the map information 36.

The building specifying unit 31 identifies the surrounding building 9 present within a predetermined range with respect to the imaging terminal 12 by collating the position information included in the specifying information 15 with the map information 36. In FIG. 3, only a bridge is displayed as the surrounding building 9 on the map information 36 in order to prevent complication of the drawing, but the surrounding building 9 includes another building such as a road, a tunnel, a dam, an embankment, and a building. Although the "predetermined range" is not particularly limited, it is preferable for the range to be a range in which the surrounding building 9 can be confirmed with naked eye of a photographer in order to request the user of the imaging terminal 12 to image the image acquisition area 17. This range can be determined by an experiment or a simulation.

Then, the building specifying unit 31 identifies the surrounding building 9 (diagonally displayed in the figure) in the imaging range R of the imaging unit 22 of the imaging terminal 12 from among the previously specified surrounding buildings 9 on the basis of the imaging direction included in the specifying information 15 and the focal length information 23 (angle of view information). The building specifying unit 31 can discriminate an imaging direction in which the imaging optical axis of the imaging unit 22 of the imaging terminal 12 is directed, and can discriminate the imaging range R (angle of view) of the imaging unit 22 of the imaging terminal 12 from the focal length information 23. Therefore, the building specifying unit 31 can specify the surrounding building 9 in the imaging range R of the imaging unit 22 of the imaging terminal 12 among the previously specified surrounding buildings 9 on the basis of a result of the discrimination.

Referring back to FIG. 2, the building specifying unit 31 outputs the specifying result of specifying the surrounding building 9 in the imaging range R of the imaging terminal 12 (the imaging unit 22) to the necessity evaluation unit 32. For example, coordinates (for example, GPS coordinates) of the surrounding building 9 are included in this specifying result as information capable of specifying the surrounding building 9 in the imaging range R. In a case where a name, an address, or the like of the surrounding building 9 can be specified from the map information 36, the name or the address of the surrounding building 9 may be included in the specifying result described above.

The necessity evaluation unit 32 performs necessity evaluation to evaluate whether or not there is an image acquisition area 17 in which acquisition of new captured image data 13 is necessary for the surrounding building 9 in the imaging range R by referring to the maintenance and inspection information 38 registered in the database 16 on the basis of the specifying result input from the building specifying unit 31.

Figure 4:
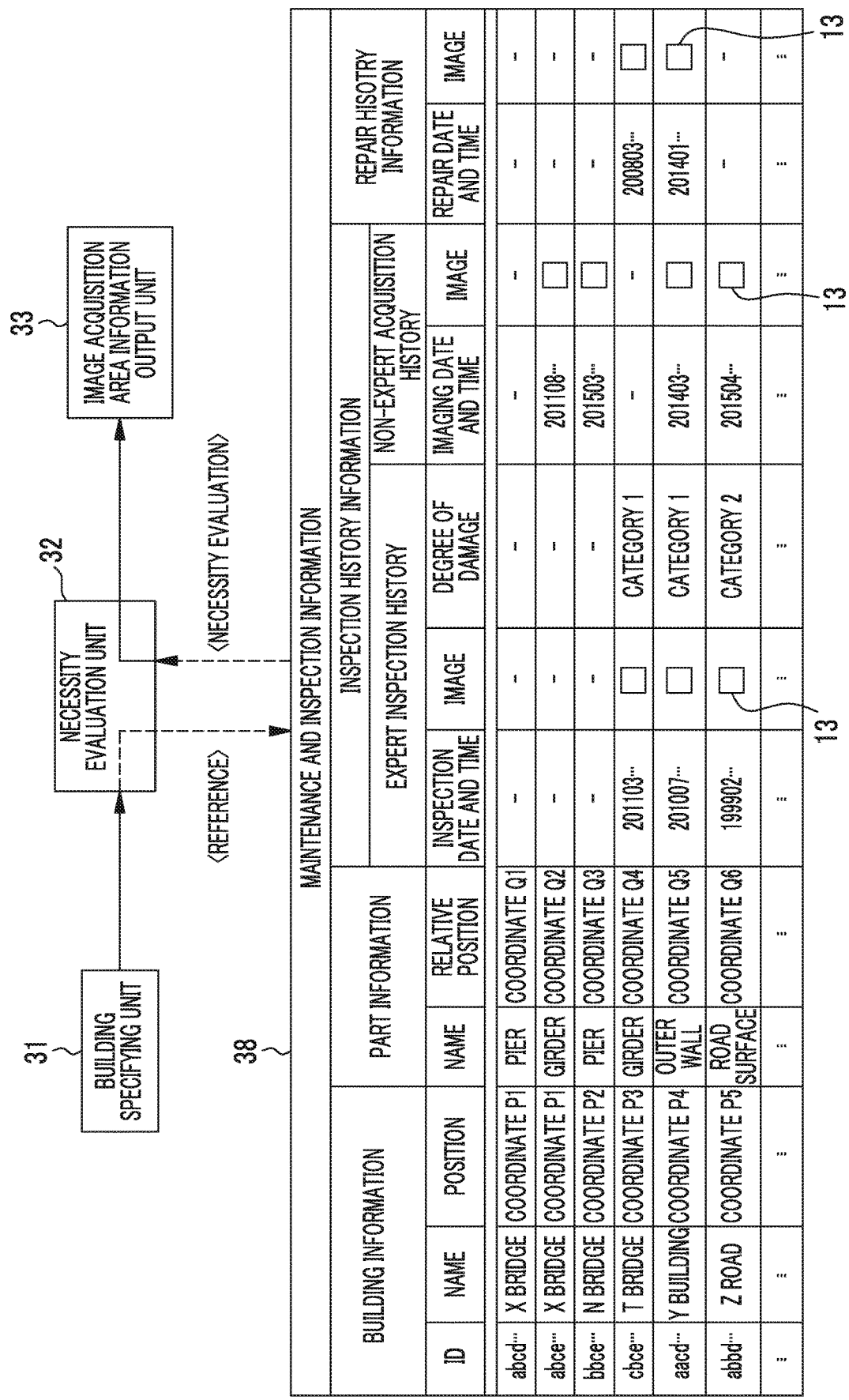
FIG. 4 is an illustrative diagram illustrating an example of maintenance and inspection information registered in a database.

FIG. 4 is an illustrative diagram illustrating an example of the maintenance and inspection information 38 registered in the database 16. As illustrated in FIG. 4, the maintenance and inspection information 38 is information indicating a result of the maintenance and inspection performed on a plurality of buildings (including objects other than the surrounding building 9) in a country or region in which the imaging support system 10 is used. This maintenance and inspection information 38 includes "Building information", "Part information", "Inspection history information", and "Repair history information".

The "Building information" is information from which each of a plurality of buildings can be identified, and includes "identification (ID)" which is an identification number previously attached to each building, a "name" of the building, a "Position" on the map (in this example, coordinates such as GPS coordinates) of the building, and the like. The "position" preferably includes coordinates of a plurality of points on an outline of the building so that a three-dimensional shape of the building can be recognized. Further, an address of the building and a type (a bridge, a road, a tunnel, a dam, an embankment, a building, or the like) of building, and the like may be included in the "Building information.

The "Part information" is information from which a part in which inspection is necessary in a building can be identified, and includes a "name" of the part and a "Relative position" (coordinates in the present example) of the part in the building. The "Name" is, for example, a pier, a girder, or the like in a case where the building is a bridge, and a ceiling, a side wall surface, or the like in a case where the building is a tunnel. Since a point (part) in which inspection is necessary for each type of building is well known, specific description thereof will be omitted. The "Relative position" is position information (coordinates in the present example) with reference to a building, and this "Relative position" preferably includes position information of a plurality of points of an outline of the part so that a three-dimensional shape of the part can be recognized. Instead of or in addition to the "Relative position", an absolute position of an earth reference such as the GPS coordinates described above may be registered in the "Part information".

The "Inspection history information" is information indicating a history of inspection that is performed on a part required to be inspected in a building, and includes an "Expert inspection history" and a "Non-expert acquisition history".

The "Expert inspection history" is an inspection result of an expert with expertise regarding inspection of a building inspecting a part inside the building, and includes "Inspection date and time", an "Image", and a "Degree of damage". The "Expert inspection history" may include a type (for example, crack, corrosion, looseness, rupture, deflection, or leakage) occurring in the building of the damage.

The "Inspection date and time" is date and time in a case where the inspection of the part of the building has been performed by the expert. The "Image" is captured image data 13 that an expert captures at the time of inspecting the part of a building.

The "Degree of damage" is an evaluation of a degree of damage occurring at a part inside a building. In this example, the degree of damage is classified into four categories including category 1 (a state in which there is no interference with a function of the building), category 2 (a state in which there is no interference with the function of the building, but it is preferable to take measures from the viewpoint of preventive maintenance), category 3 (a state in which interference with the function of the building is likely to occur, and measures should be taken at an early stage), and category 4 (a state in which interference with the function of the building occurs or interference with the function of the building is highly likely to occur, and measures should be taken urgently), and evaluated. For details of the four categories, please refer to a periodic road bridge inspection procedure or a periodic bridge inspection procedure issued by the Ministry of Land, Infrastructure and Transport. The categorization of the degree of damage is not particularly limited to the categorization described above.

The "Non-expert acquisition history" is an acquisition history of captured image data 13 of a building (including a part in the building) imaged by an ordinary person who does not have expertise regarding inspection of the building, that is, the user of the imaging terminal 12, and includes "Imaging date and time" and "Image". The "Imaging date and time" is date and time when the imaging of the building has been performed in the imaging terminal 12, and can be acquired from tag information of the captured image data 13, for example. The "Image" is the captured image data 13 of the building imaged by the imaging terminal 12.

The "Repair history information" is information indicating a repair history performed on parts of a plurality of buildings, and includes "Repair date and time" and "Image". The "Repair date and time" is date and time when repair has been performed on the part in the building. The "Image" is the captured image data 13 obtained by imaging the part in the building before and after the repair, and is captured by the expert. Further, content of the repair performed on the part in the building may be registered in the "Repair history information".

The necessity evaluation unit 32 accesses the database 16 on the basis of the specifying result input from the building specifying unit 31 and refers to the maintenance and inspection information 38 corresponding to the surrounding building 9 in the imaging range R. The necessity evaluation unit 32 performs necessity evaluation to evaluate whether or not there is the image acquisition area 17 in which acquisition of the new captured image data 13 is necessary for the surrounding building 9 in the imaging range R on the basis of whether the "Inspection history information" and the "Repair history information" have been registered in the maintenance and inspection information 38 that has been referred to, and quality thereof.

Here, in this example (the first embodiment), it is assumed that the necessity evaluation for the surrounding building 9 in the imaging range R is performed in units of individual surrounding buildings 9 in the imaging range R, and is not performed in units of parts of the surrounding building 9 in order to facilitate understanding of the invention. That is, the image acquisition area 17 in this example is not a part of the surrounding building 9, and refers to the entire surrounding building 9 including the part in which acquisition of new captured image data 13 is necessary (see FIG. 6). An example in which the necessity evaluation for the surrounding building 9 in the imaging range R is performed in units of parts of the surrounding building 9 will be described in the second embodiment to be described below.

Whether the "Inspection history information" and the "Repair history information" have been registered indicates whether or not the captured image data 13 obtained by previously imaging the surrounding buildings 9 in the imaging range R has been registered in the database 16. In a case where the captured image data 13 obtained by previously imaging the surrounding building 9 in the imaging range R is not registered in the database 16, the acquisition of new captured image data 13 of the surrounding building 9 is necessary.

The quality of the "Inspection history information" includes an elapsed time from the "Inspection date and time" registered in "Expert inspection history" to current time and image quality of the registered captured image data 13, and an elapsed time from the "Imaging date and time" registered in "Non-expert acquisition history" to current time, and image quality of the registered captured image data 13. Further, the quality of the "Repair history information" includes an elapsed time from "Repair date and time" registered in the "Repair history information" to current time, and the image quality of registered captured image data 13.

Even in a case where the captured image data 13 obtained by previously imaging the surrounding building 9 in the imaging range R has been registered in the database 16, the captured image data 13 cannot be said to indicate a current state of the surrounding building 9 in a case where a predetermined time (constant time) has elapsed from each of a time of inspection of the expert, a time of imaging of an ordinary person, and a time of repair. Therefore, acquisition of new captured image data 13 of this surrounding building 9 is necessary.

Further, even in a case where the captured image data 13 obtained by previously imaging the surrounding building 9 in the imaging range R has been registered in the database 16, a current state of the surrounding building 9 cannot be confirmed from the captured image data 13 in a case where the image quality of the captured image data 13 is not appropriate, and therefore, acquisition of the new captured image data 13 of this surrounding building 9 is necessary. In a case where the image quality of the captured image data 13 is appropriate, the resolution, exposure, distortion, blur, or bokeh of the captured image data 13 is appropriate in the present example, but the present invention is not particularly limited thereto.

Figure 5:
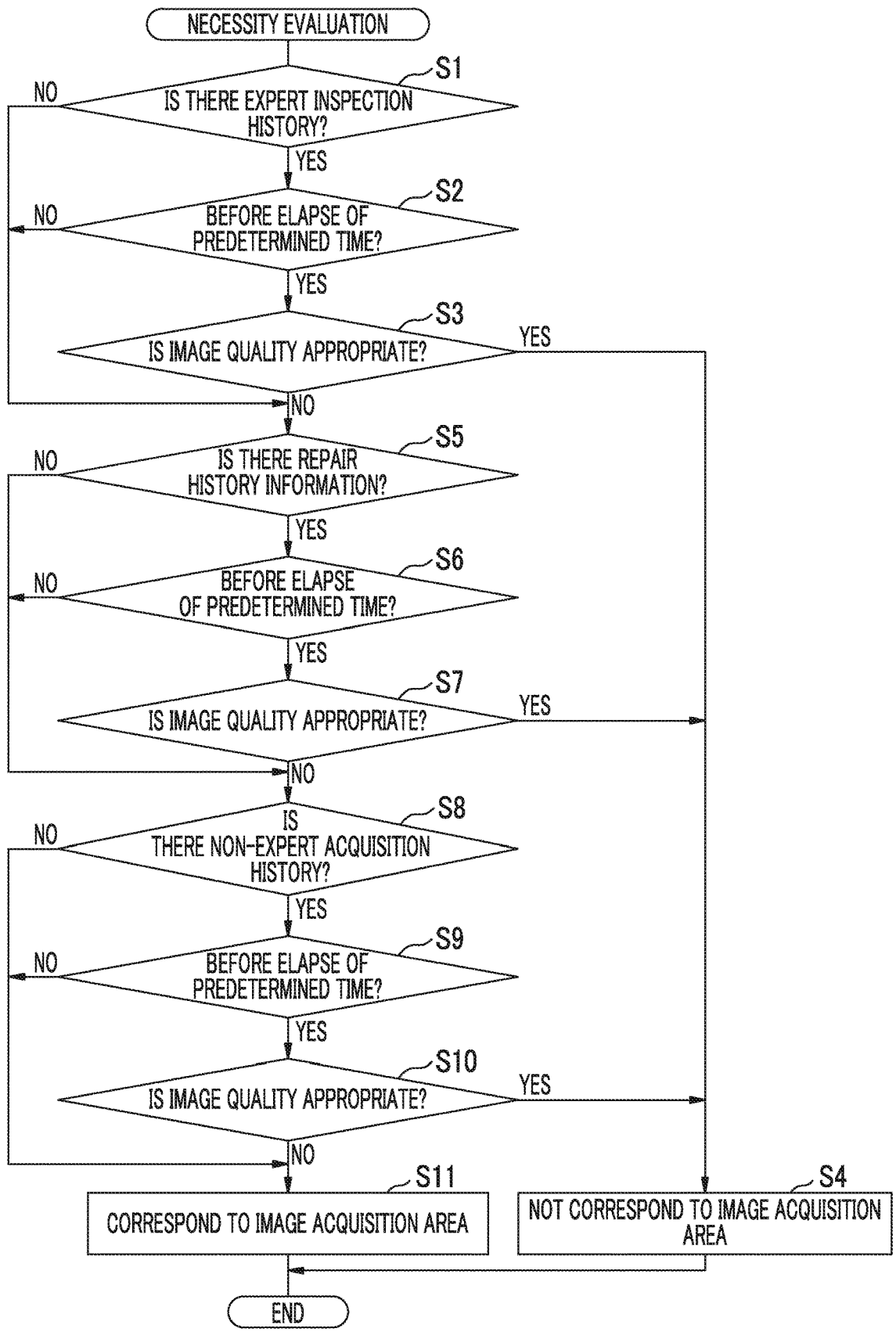
FIG. 5 is a flowchart illustrating a flow of a necessity evaluation process in a necessity evaluation unit.

FIG. 5 is a flowchart illustrating a flow of the necessity evaluation process in the necessity evaluation unit 32. As illustrated in FIG. 5, the necessity evaluation unit 32 evaluates whether or not the "Expert inspection history" has been registered in the individual maintenance and inspection information 38 by accessing the database 16 and referring to the maintenance and inspection information 38 corresponding to the surrounding building 9 in the imaging range R (step S1).

Then, for the maintenance and inspection information 38 in which the "Expert inspection history" has been evaluated to have been registered (YES in step S1), the necessity evaluation unit 32 evaluates whether or not an elapsed time from the "Inspection date and time" registered in the "Expert inspection history" to the present time is before the elapse of a predetermined time (step S2).

For the maintenance and inspection information 38 in which it is evaluated that the predetermined time has not elapsed from the "Inspection date and time" in step S2 (YES in step S2), the necessity evaluation unit 32 evaluates whether or not the image quality of the captured image data 13 registered in the "Expert inspection history" is appropriate (step S3). Since the captured image data 13 registered in the "Expert inspection history" is also captured by the expert described above and the image quality is highly likely to be appropriate, the evaluation in step S3 may be omitted.

In step S3, the necessity evaluation unit 32 detects resolution, exposure, distortion, blur, or bokeh from the captured image data 13 registered in the "Expert inspection history", and evaluates that the image quality of the captured image data 13 is appropriate in a case where all of the resolution, the exposure, the distortion, the blur, and the bokeh satisfy respective predetermined references (YES in step S3). On the other hand, in a case where one or a predetermined number of the resolution, the exposure, the distortion, the blur, and the bokeh of the captured image data 13 do not satisfy the references, the necessity evaluation unit 32 evaluates that the image quality of the captured image data 13 is not appropriate (NO in step S3).

The necessity evaluation unit 32 need not to acquire the captured image data 13 for the surrounding building 9 in which the corresponding maintenance and inspection information 38 has been evaluated as YES in all steps S1 to S3 among the surrounding buildings 9 in the imaging range R, and evaluates that the surrounding building 9 does not correspond to the image acquisition area 17 (step S4). Here, in a case where there is only one part in the surrounding building 9, the "corresponding maintenance and inspection information 38" in this example (the first embodiment) is maintenance and inspection information 38 of the part. In a case where there are a plurality of parts in the surrounding building 9, the "corresponding maintenance and inspection information 38" is maintenance and inspection information 38 of all the parts.

On the other hand, for the maintenance and inspection information 38 corresponding to the surrounding building 9 in the imaging range R evaluated as NO in any one of steps S1 to S3, the necessity evaluation unit 32 evaluates whether or not the "Repair history information" is registered in the maintenance and inspection information 38 (step S5).

Then, for the maintenance and inspection information 38 in which the "Repair history information" has been evaluated to have been registered (YES in step S5), the necessity evaluation unit 32 evaluates whether or not an elapsed time from the "Repair date and time" registered in the "Repair history information" to the present time is before the elapse of a predetermined time (step S6).

For the maintenance and inspection information 38 in which it is evaluated that the predetermined time has not elapsed from the "Repair date and time" in step S5 (YES in step S6), the necessity evaluation unit 32 evaluates whether or not the image quality of the captured image data 13 registered in the "Repair history information" is appropriate as in step S3 described above (step S7). Since the captured image data 13 registered in the "Repair history information" is also captured by the expert described above and the image quality is highly likely to be appropriate, the evaluation in step S7 may be omitted.

The necessity evaluation unit 32 need not to acquire new captured image data 13 for the surrounding building 9 in which the corresponding maintenance and inspection information 38 has been evaluated as YES in all of steps S5 to S7 among the surrounding buildings 9 in the imaging range R, and evaluates that the surrounding building 9 does not correspond to the image acquisition area 17 (step S4).

On the other hand, for the maintenance and inspection information 38 of the surrounding building 9 in the imaging range R evaluated as NO in any one of step S5 to step S7, the necessity evaluation unit 32 evaluates whether or not the "Non-expert acquisition history" has been registered in the maintenance and inspection information 38 (step S8).

Then, for the maintenance and inspection information 38 in which the "Non-expert acquisition history" has been evaluated to have been registered (YES in step S8), the necessity evaluation unit 32 evaluates whether or not an elapsed time from the "Imaging date and time" registered in the "Non-expert acquisition history" to the present time is before the elapse of a predetermined time (step S9).

For the maintenance and inspection information 38 in which it is evaluated that the predetermined time has not elapsed from the "Imaging date and time" in step S9 (YES in step S9), the necessity evaluation unit 32 evaluates whether or not the image quality of the captured image data 13 registered in the "Non-expert acquisition history" is appropriate as in step S3 described above (step S10).

The necessity evaluation unit 32 need not to acquire new captured image data 13 for the surrounding building 9 in which the corresponding maintenance and inspection information 38 has been evaluated as YES in all of steps S8 to S10 among the surrounding buildings 9 in the imaging range R, and evaluates that the surrounding building 9 does not correspond to the image acquisition area 17 (step S4).

Figure 6:
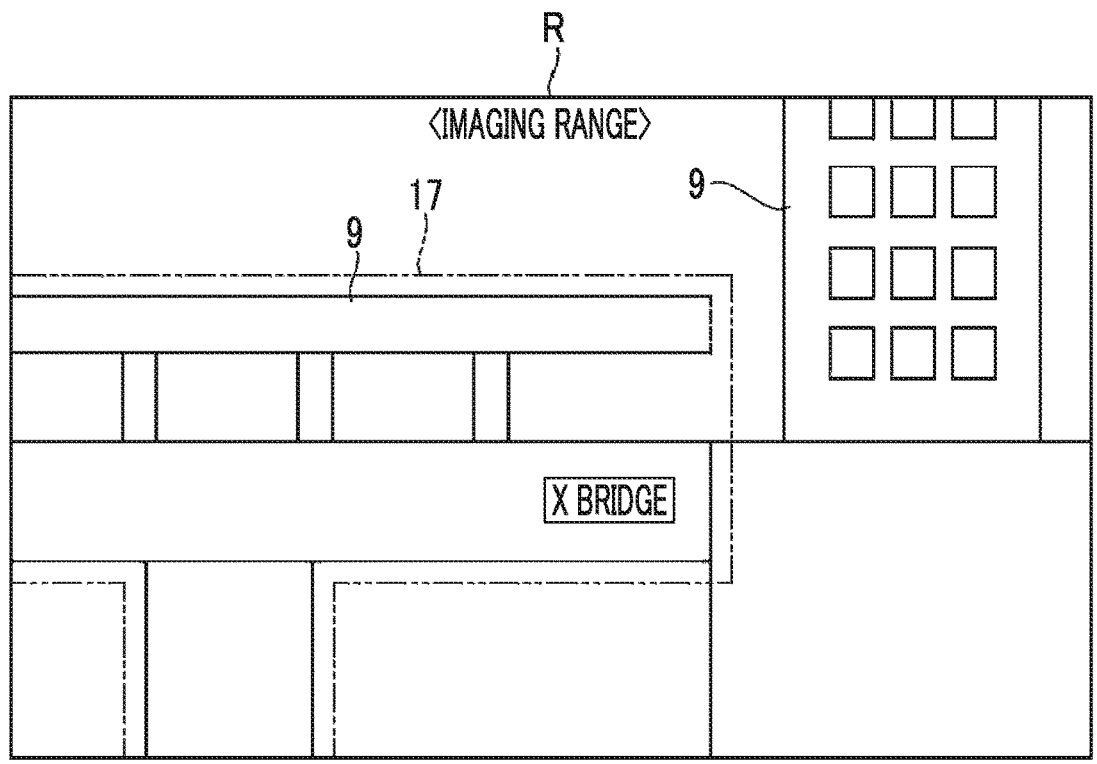
FIG. 6 is an illustrative diagram illustrating a process of step S11 in FIG. 5.

FIG. 6 is an illustrative diagram illustrating the process of step S11 of FIG. 5. As illustrated in FIGS. 5 and 6, in a case where there is the surrounding building 9 in which the corresponding maintenance and inspection information 38 has been evaluated as NO in any one of steps S8 to S10 among the surrounding buildings 9 in the imaging range R, the necessity evaluation unit 32 evaluates that the surrounding building 9 corresponds to the image acquisition area 17 in which acquisition of new captured image data 13 is necessary (step in FIG. 5).

Thus, the necessity evaluation process in the necessity evaluation unit 32 is completed. The necessity evaluation unit 32 outputs the evaluation result of the necessity evaluation to the image acquisition area information output unit 33 (see FIGS. 2 and 4).

The necessity evaluation method in the necessity evaluation unit 32 is not limited to the method described in the flowchart illustrated in FIG. 5, and may be appropriately changed. For example, the evaluation (steps S1 to S3) of the "Expert inspection history", the evaluation of the "Repair history information" (steps S5 to S7), and the evaluation of the "Non-expert acquisition history" (steps S8 to S10) may be weighted, and weights may be summed each time the surrounding building 9 is evaluated as YES in each evaluation, and necessity evaluation may be performed on the basis of a sum of the weights of the respective evaluations. In this case, it is evaluated whether or not the surrounding building 9 does not correspond to or corresponds to the image acquisition area 17 on the basis of whether the sum of the weights of the respective evaluations is equal to or greater than a predetermined reference value.

Further, items of the necessity evaluation in the necessity evaluation unit 32 are not limited to the evaluation (steps S1 to S3) of the "Expert inspection history" described in the flowchart illustrated in FIG. 5, the evaluation of the "Repair history information" (steps S5 to S7), and the evaluation of the "Non-expert acquisition history" (steps S8 to S10), and evaluation items may be appropriately added. Further, the evaluations to be executed and the evaluations not to be executed among the evaluations of the respective steps illustrated in FIG. 5 may be selected.

Referring back to FIG. 2, in a case where there is the image acquisition area 17 in which acquisition of new captured image data 13 is necessary for the surrounding building 9 in the imaging range R of the imaging terminal 12, the image acquisition area information output unit 33 generates the image acquisition area information 17A indicating this image acquisition area 17 on the basis of the evaluation result of the necessity evaluation input from the necessity evaluation unit 32. The image acquisition area information output unit 33 outputs the generated image acquisition area information 17A to the imaging terminal 12 that is an output source (transmission source) of the specifying information 15 or the like on the basis of the supplementary information 24 previously acquired from the specifying information acquisition unit 30. The image acquisition area information output unit 33 may be integrated with the specifying information acquisition unit 30 described above.

The image acquisition area information 17A includes information indicating a position and a shape of the image acquisition area 17 in the imaging range R of the imaging terminal 12.

For example, in a case where the above-described map information 36 is three-dimensional map data, the position and the shape of the image acquisition area 17 (the surrounding building 9 corresponding to the image acquisition area 17) in the imaging range R can be discriminated on the basis of the three-dimensional shape of the surrounding building 9 recorded in map information 36, the position information and the imaging direction of the imaging terminal 12, and the focal length information 23 of the imaging terminal 12. In a case where a plurality of coordinates indicating an outline of the surrounding building 9 are registered in the "position" of the "Building information" of the maintenance and inspection information 38 in the database 16, the position and the shape of the image acquisition area 17 can be discriminated by obtaining a three-dimensional shape of the surrounding building 9 corresponding to the image acquisition area 17 from these coordinates and comparing the three-dimensional shape with other position information, imaging direction, and focal length information 23. A method of discriminating the position and the shape of the image acquisition area 17 in the imaging range R is not particularly limited.

The database management unit 34 acquires the captured image data 13 of the image acquisition area 17 described below output from the imaging terminal 12, and registers the captured image data 13 in the "Non-expert acquisition history" of the maintenance and inspection information 38 of the surrounding building 9 corresponding to the image acquisition area 17.

<Imaging Terminal>

The imaging terminal 12 includes the above-described position information acquisition unit 20, the above-described imaging direction acquisition unit 21, the above-described imaging unit 22, a storage unit 40, a specifying information output unit 41, an image acquisition area information acquisition unit 42, a display control unit 43, a display unit 44, and an image output unit 45.

The storage unit 40 stores a program 46 that is an application program for causing the imaging terminal 12 to function as a part of the imaging support system 10, and the above-described supplementary information 24. By staring up this program 46, the output of the specifying information 15 or the like in the imaging terminal 12, the acquisition and display of the image acquisition area information 17A in the imaging terminal 12, and the output of the captured image data 13 in the imaging terminal 12 to the imaging support device 14 are executed.

The imaging unit 22 includes an optical system and an image sensor, and starts imaging of the subject including the surrounding building 9 and sequentially outputs the captured image data 13 for a live view display to the display control unit 43 under the control of the program 46. Further, the imaging unit 22 outputs the focal length information 23 of the optical system to the specifying information output unit 41 under the control of the program 46.

The specifying information output unit 41 outputs the specifying information 15 including the position information acquired by the position information acquisition unit 20 and the imaging direction acquired by the imaging direction acquisition unit 21 to the imaging support device 14 under the control of the program 46. Further, the specifying information output unit 41 outputs the focal length information 23 acquired from the imaging unit 22 and the supplementary information 24 acquired from the storage unit 40 to the imaging support device 14. Accordingly, the specifying information acquisition unit 30 of the imaging support device 14 acquires the specifying information 15, the focal length information 23, and the supplementary information 24. As a result, the above-described image acquisition area information 17A is output from the image acquisition area information output unit 33 of the imaging support device 14 to the imaging terminal 12.

The image acquisition area information acquisition unit 42 is a communication interface that can be communicatably connected to the imaging support device 14 in a wired or wireless way. The image acquisition area information acquisition unit 42 may be integrated with the specifying information output unit 41 described above. The image acquisition area information acquisition unit 42 acquires the image acquisition area information 17A output from the image acquisition area information output unit 33 and outputs the image acquisition area information 17A to the display control unit 43 under the control of the program 46.

The display control unit 43 displays the live view image on the display unit 44 of the imaging terminal 12 on the basis of the captured image data 13 input from the imaging unit 22 under the control of the program 46. For example, an example of the display unit 44 may include a so-called touch panel that displays an image, text information, or the like to visually deliver information to the user, and detects a user operation with respect to the displayed information. The display unit 44 is not limited to a display unit provided integrally with the imaging terminal 12, and includes a display unit connected to the imaging terminal 12 in a wired or wireless way.

In a case where the image acquisition area information 17A is input from the image acquisition area information acquisition unit 42, the display control unit 43 can cause the image acquisition area 17 to be discriminably displayed on the live view image by the display unit 44 on the basis of the image acquisition area information 17A.

Figure 7:
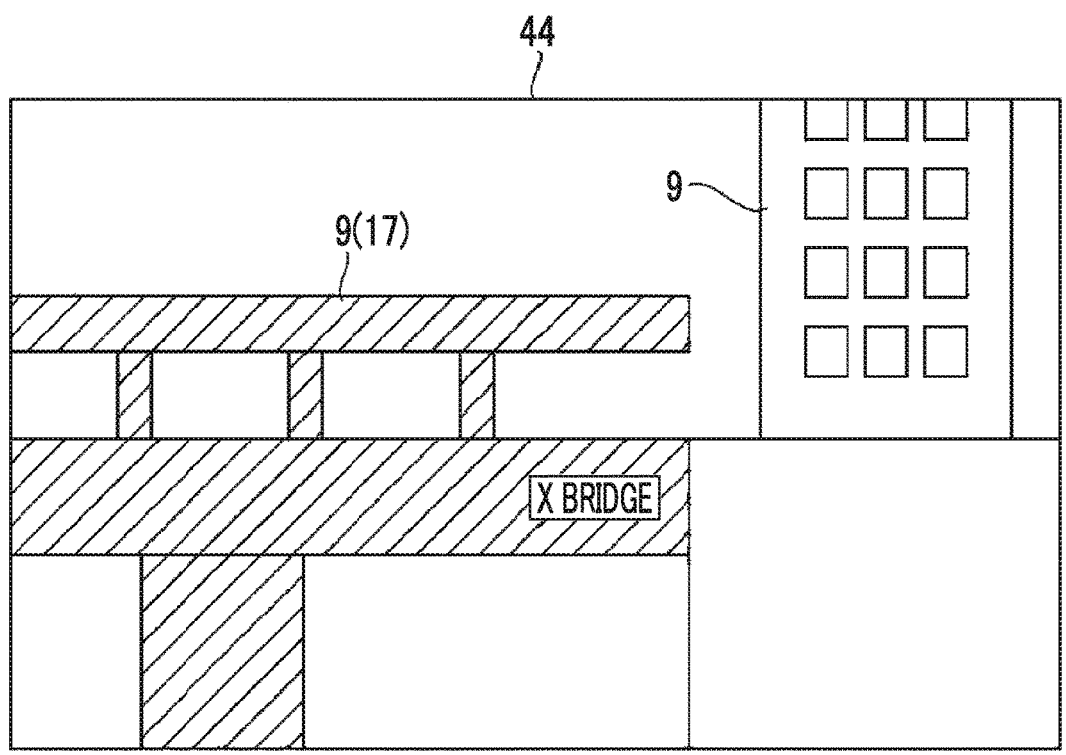
FIG. 7 is an illustrative diagram illustrating an example of an image acquisition area that is displayed on a live view image in a display unit of an imaging terminal.

FIG. 7 is an illustrative diagram illustrating an example of the image acquisition area 17 displayed on the live view image by the display unit 44 of the imaging terminal 12. As illustrated in FIG. 7, the display control unit 43 discriminates the position and the shape of the image acquisition area 17 within the display surface of the display unit 44 on the basis of the position and the shape of the image acquisition area 17 in the imaging range R included in the image acquisition area information 17A. The display control unit 43 changes a display aspect of the portion corresponding to the image acquisition area 17 in the live view image displayed on the display unit 44 on the basis of the discrimination result.

Here, when the display aspect is changed, brightness or color tone (saturation or hue) of the portion corresponding to the image acquisition area 17 in the display unit 44 is changed, or various patterns or mark or the like is displayed to be superimposed (overlayed) on the portion corresponding to the image acquisition area 17. Accordingly, the image acquisition area 17 can be discriminably displayed on the live view image displayed on the display unit 44. As a result, it is possible to request the user of the imaging terminal 12 to image the image acquisition area 17 (the surrounding building 9 in which acquisition of new captured image data 13 is necessary).

Referring back to FIG. 2, in a case where the imaging unit 22 receives an input of the imaging operation from the user of the imaging terminal 12 while the live view image is being displayed by the display unit 44, the imaging unit 22 performs imaging of a subject (the image acquisition area 17) to generate captured image data 13, and outputs the captured image data. 13 to the image output unit 45 under the control of the program 46.

The image output unit 45 outputs the captured image data 13 input from the imaging unit 22 to the imaging support device 14 under the control of the program 46. Accordingly, the captured image data 13 of the image acquisition area 17 is acquired by the database management unit 34, and the captured image data 13 is registered in the "Non-expert acquisition history" of the maintenance and inspection information 38 of the surrounding building 9 corresponding to the image acquisition area 17.

[Operation of Image Registration System of First Embodiment]

Figure 8:
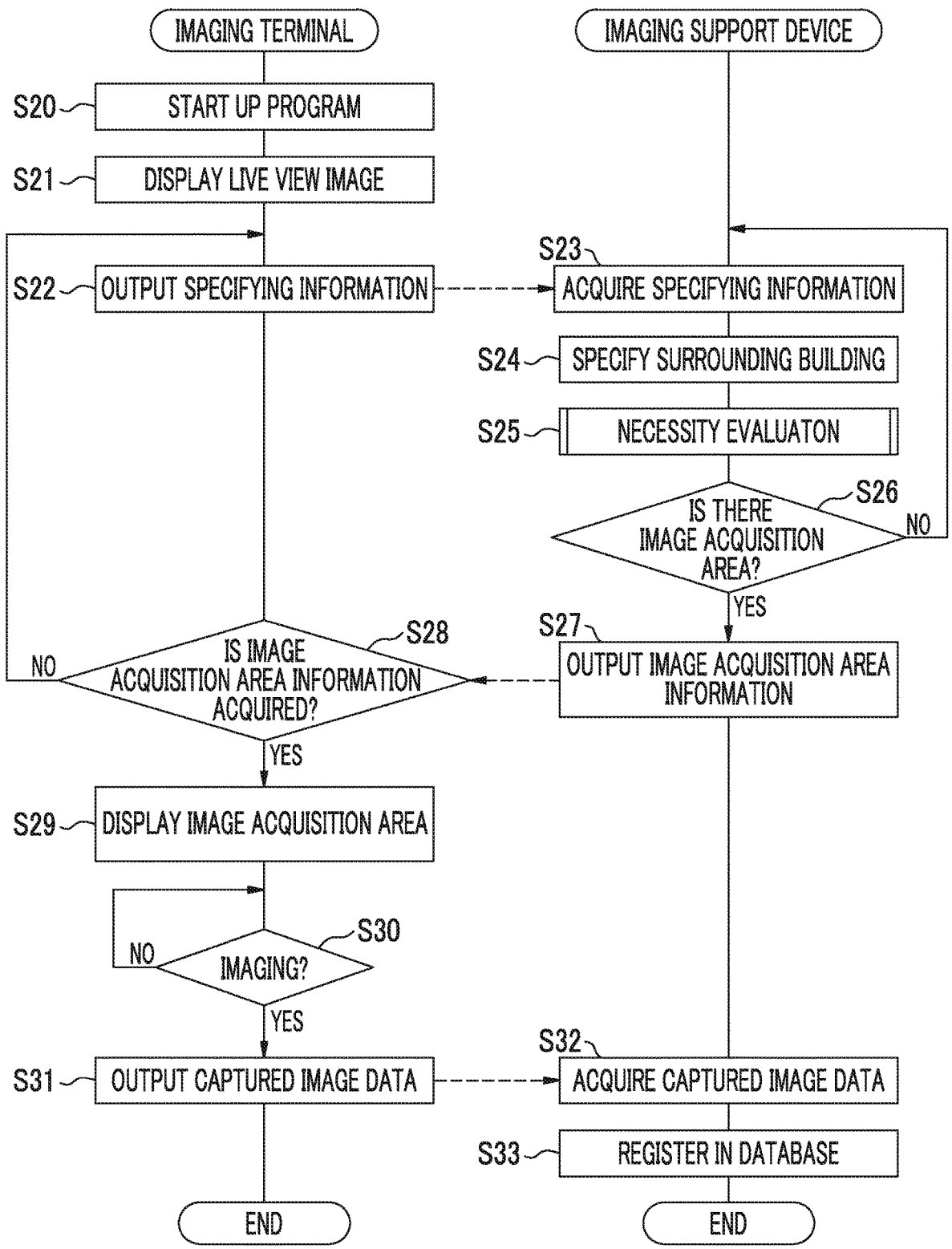
FIG. 8 is a flowchart illustrating a flow of an imaging support process for an imaging terminal in the imaging support system of the first embodiment.

Next, an operation of the imaging support system 10 having the above configuration will be described with reference to FIG. 8. FIG. 8 is a flowchart illustrating a flow of the imaging support process (the imaging support method of the present invention) for the imaging terminal 12 in the imaging support system 10 of the first embodiment.

<Output of Specifying Information from Imaging Terminal>

In a case where the user of the imaging terminal 12 performs a start-up operation of the program 46, the program 46 is executed in the imaging terminal 12 (step S20). Under the control of the program 46, the imaging unit 22 starts imaging a subject including the surrounding building 9, and sequentially outputs the captured image data 13 for a live view display to the display control unit 43. Accordingly, the display control unit 43 displays a live view image on the display unit 44 (step S21).

Further, under the control of the program 46, the imaging support device 14 outputs the specifying information 15 based on the position information acquired from the position information acquisition unit 20 and the imaging direction acquired from the imaging direction acquisition unit 21 to the specifying information output unit 41 (step S22). Further, the specifying information output unit 41 outputs the focal length information 23 acquired from the imaging unit 22 and the supplementary information 24 acquired from the storage unit 40 to the imaging support device 14.

<Necessity Evaluation in Imaging Support Device>

The specifying information acquisition unit 30 of the imaging support device 14 acquires the specifying information 15, the focal length information 23, and the supplementary information 24 output from the imaging terminal 12 (step S23, which corresponds to a specifying information acquisition step of the present invention). The specifying information acquisition unit 30 outputs the acquired specifying information 15 and the acquired focal length information 23 to the building specifying unit 31, and outputs the acquired supplementary information 24 to the image acquisition area information output unit 33.

The building specifying unit 31 which has received an input of the specifying information 15 and the focal length information 23 from the specifying information acquisition unit 30, as illustrated in FIG. 3 described above, first specifies the surrounding building 9 of the imaging terminal 12 on the basis of the position information included in the specifying information 15 and the map information 36 acquired from the database 16 (step S24, which corresponds to an inspection target specifying step of the present invention). Then, the building specifying unit 31 specifies the surrounding building 9 included in the imaging range R of the imaging terminal 12 (the imaging unit 22) on the basis of the imaging direction and the focal length information 23 included in the specifying information 15, and outputs a specifying result to the necessity evaluation unit 32.

The necessity evaluation unit 32 which has received an input of the specifying result of the surrounding building 9 in the imaging range R from the building specifying unit 31 accesses the database 16 on the basis of this specifying result and refers to maintenance and inspection information 38 corresponding to the surrounding building 9 in the imaging range R. The necessity evaluation unit 32 performs necessity evaluation to evaluate whether or not there is the image acquisition area 17 in which acquisition of the new captured image data 13 is necessary for the surrounding building 9 in the imaging range R (step S25, which corresponds to a necessity evaluation step of the present invention), as illustrated in FIGS. 5 and 6 described above. The necessity evaluation unit 32 outputs an evaluation result of necessity evaluation to the image acquisition area information output unit 33.

In a case where there is the image acquisition area 17 for the surrounding building 9 in the imaging range R, the image acquisition area information output unit 33 which has received the evaluation result of the necessity evaluation from the necessity evaluation unit 32 generates the image acquisition area information 17A including information indicating a position and a shape of the image acquisition area 17 in the imaging range R, as described above (YES in step S26). On the other hand, in a case where there is no image acquisition area 17, the image acquisition area information output unit 33 enters a standby state until the evaluation result indicating that there is the image acquisition area 17 is input from the necessity evaluation unit 32 (NO in step S26).

In the case of YES in step S26, the image acquisition area information output unit 33 outputs the image acquisition area information 17A to the imaging terminal 12 that is the output source (transmission source) of the specifying information 15 or the like on the basis of the supplementary information 24 previously acquired from the specifying information acquisition unit 30 (step S27, which corresponds to an image acquisition area information output step of the present invention).

<Display of Image Acquisition Area in Imaging Terminal>

The image acquisition area information acquisition unit 42 of the imaging terminal 12 enters a standby state until the image acquisition area information 17A is output from the imaging support device 14. In this case, the display of the live view image on the display unit 44 described in step S21 described above and the output of the specifying information 15 or the like described in step S22 described above are continued (NO in step S28).

In a case where the image acquisition area information 17A is output from the imaging support device 14, the image acquisition area information acquisition unit 42 acquires the image acquisition area information 17A and outputs the image acquisition area information 17A to the display control unit 43 (YES in step S28).

The display control unit 43 which has received an input of the image acquisition area information 17A from the image acquisition area information acquisition unit 42 discriminates a position and a shape of the image acquisition area 17 within a display surface of the display unit 44 on the basis of the image acquisition area information 17A. The display control unit 43 changes a display aspect of a portion corresponding to the image acquisition area 17 within the live view image displayed on the display unit 44, as illustrated in FIG. 7 described above on the basis of a result of the discrimination of the position and the shape of the image acquisition area 17. Accordingly, the image acquisition area 17 is discriminably displayed on the live view image displayed on the display unit 44 (step S29, which corresponds to a display step of the present invention). As a result, the user of the imaging terminal 12 can recognize the surrounding building 9 in which acquisition of new captured image data 13 is necessary in the image acquisition area 17, that is, the surrounding building 9 in the imaging range R.

<Output of Captured Image Data of Image Acquisition Area>

The user of the imaging ter urinal 12 adjusts a position and a direction of the imaging terminal 12 so that the image acquisition area 17 is located at a center of the imaging range R (angle of view) of the imaging unit 22 on the basis of the image acquisition area 17 in the live view image displayed on the display unit 44. Zoom adjustment or the like may be performed as necessary. Then, the user performs an imaging operation on the imaging terminal 12 (YES in step S30). The imaging unit 22 receives this imaging operation, and performs imaging of the image acquisition area 17 to generate captured image data 13, and outputs the captured image data 13 to the image output unit 45 under the control of the program 46.

The image output unit 45 which has received the captured image data 13 of the image acquisition area 17 from the imaging unit 22 outputs the captured image data 13 to the imaging support device 14 under the control of the program 46 (step S31).

<Registration in Database>

The database management unit 34 of the imaging support device 14 acquires the captured image data 13 of the image acquisition area 17 output from the imaging terminal 12 (step S32). Then, the database management unit 34 accesses the database 16 and registers the acquired captured image data 13 of the image acquisition area 17 in the "Non-expert acquisition history" of the maintenance and inspection information 38 of the surrounding building 9 corresponding to this image acquisition area 17 (step S33).

[Effects of First Embodiment]

As described above, the imaging support system 10 (the imaging support device 14) of the first embodiment performs the necessity evaluation as to whether or not there is the image acquisition area 17 in which acquisition of new captured image data 13 is necessary for the surrounding building 9 in the imaging range R of the imaging terminal 12 on the basis of, for example, the specifying information 15 acquired from the imaging terminal 12 of an ordinary person, and outputs the image acquisition area information 17A indicating the image acquisition area 17 in which acquisition is evaluated to be necessary to the imaging terminal 12. Thus, it is possible to request the user of the imaging terminal 12 to image the image acquisition area 17. As a result, it is possible to efficiently acquire the captured image data 13 of the building in which imaging is necessary from the imaging terminal 12 of the ordinary person and register the captured image data 13 in the database 16.

[Imaging Support System of Second Embodiment]

Next, an imaging support system of a second embodiment of the present invention will be described. In the first embodiment described above, the necessity evaluation unit 32 of the imaging support device 14 performs the necessity evaluation in units of the surrounding building 9 in the imaging range R, and the imaging terminal 12 performs the display of the image acquisition area 17 in units of the surrounding building 9 in the imaging range R. On the other hand, in the imaging support system of the second embodiment, the necessity evaluation is performed in units of a part (see FIG. 4) of the surrounding building 9 in the imaging range R, and the display of the image acquisition area 17 in the imaging terminal 12 is performed in units of the parts of the surrounding building 9 in the imaging range R.

Figure 9:
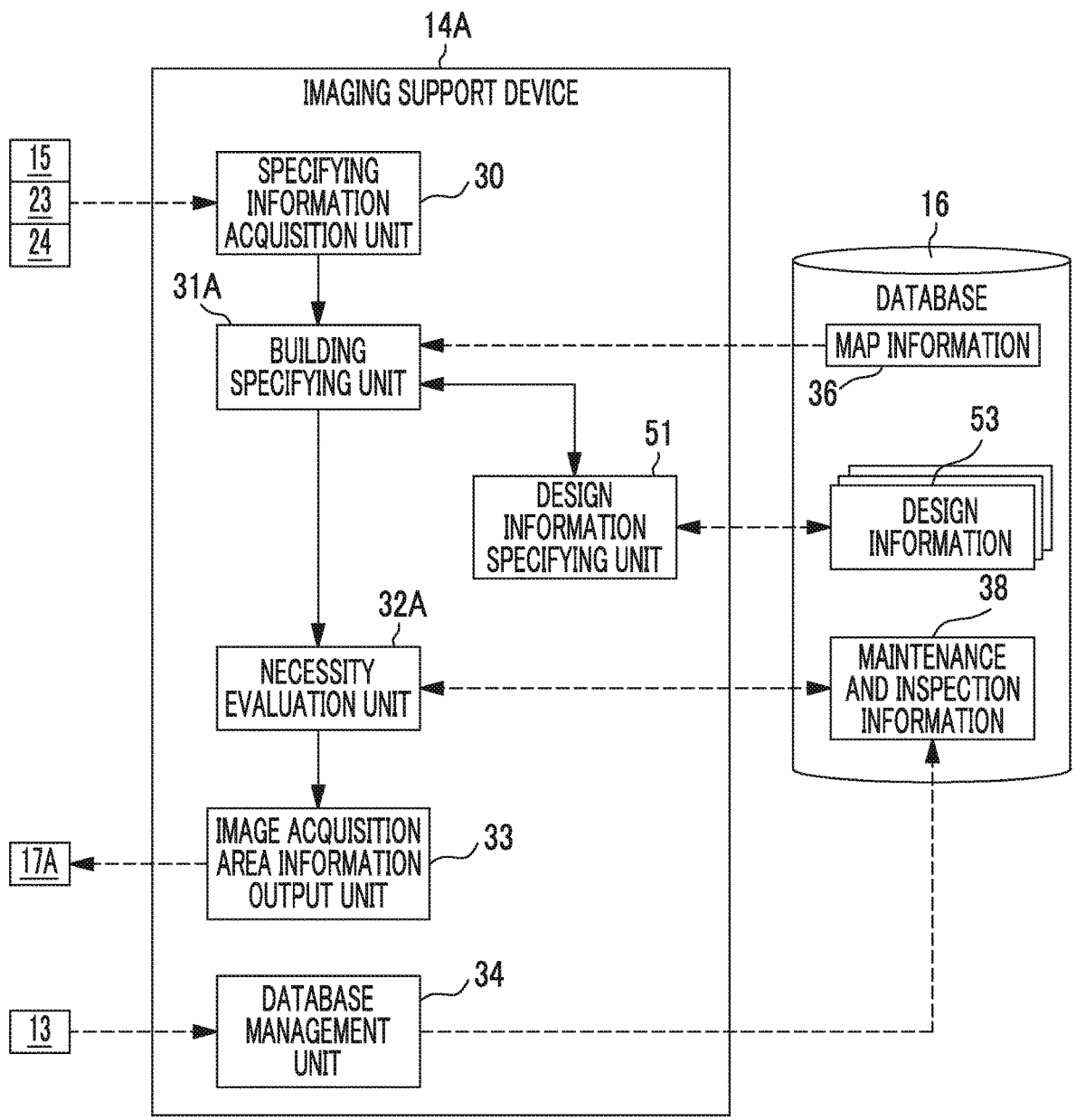
FIG. 9 is a block diagram illustrating a configuration of an imaging support device of an imaging support system of a second embodiment.

FIG. 9 is a block diagram illustrating a configuration of an imaging support device 14A of the imaging support system of the second embodiment. The imaging support system of the second embodiment has basically the same configuration as the imaging support system 10 of the first embodiment except that a part of the configuration of the imaging support device 14A is different from that of the imaging support device 14 of the first embodiment. Therefore, the same functions or configurations as those of the first embodiment are denoted with the same reference numerals, and description thereof will be omitted.

As illustrated in FIG. 9, the imaging support device 14A of the second embodiment has basically the same configuration as the imaging support device 14 of the first embodiment except that the imaging support device 14A of the second embodiment includes a design information specifying unit 51, a building specifying unit 31A corresponding to an inspection target specifying unit of the present invention, and a necessity evaluation unit 32A.

The design information specifying unit 51 acquires design information 53 of a plurality of buildings (including objects other than surrounding building 9) from a database 16, and specifies the design information 53 of the surrounding building 9 in the imaging range R on the basis of the acquired design information 53 and the specifying result of the surrounding building 9 in the imaging range R of the imaging terminal 12 acquired from the building specifying unit 31A to be describe below. The design information 53 need not be registered in a database 16 but may be registered in a server on the Internet. In this case, the design information specifying unit 51 acquires design information 53 of a plurality of buildings from the server on the Internet.

The design information 53 includes, for example, "Part information" from which all parts (including objects in which inspection is not necessary) in the building in addition to the "Building information" illustrated in FIG. 4 described above can be identified. The "Part information" includes, for example, the "name" of the part illustrated in FIG. 4 and a "Relative position" (an absolute position, or both of the relative position and the absolute position) of the part in the building. Since the position (the relative position or the absolute position) of each part in the building can be discriminated by referring to the design information 53, any part in the imaging range R can be specified in a case where the building is imaged from an arbitrary direction. The design information specifying unit 51 outputs the design information 53 of the surrounding building 9 in the imaging range R to the building specifying unit 31A.

Similar to the building specifying unit 31 of the first embodiment, the building specifying unit 31A specifies the surrounding building 9 in the imaging range R of the imaging terminal 12 and outputs the specifying result to the design information specifying unit 51. Accordingly, the building specifying unit 31A can acquire the design information 53 of the surrounding building 9 in the imaging range R, as described above.

Next, the building specifying unit 31A also specifies the part of the surrounding building 9 in the imaging range R on the basis of the position information and the imaging direction included in the specifying information 15 acquired from the specifying information acquisition unit 30, and the design information 53 of the surrounding building 9 in the imaging range R acquired from the design information specifying unit 51. Since the position (the relative position or the absolute position) of each part in the surrounding building 9 can be discriminated on the basis of the design information 53 of the surrounding building 9 in the imaging range R, it is also possible to specify the part of the surrounding building 9 in the imaging range R in a case where the surrounding building 9 is imaged from the position at which the imaging terminal 12 is present and the imaging direction.

The building specifying unit 31A outputs a specifying result of specifying the surrounding building 9 in the imaging range R of the imaging unit 22 of the imaging terminal 12 and the part thereof to the necessity evaluation unit 32A. This specifying result includes, for example, coordinates of the surrounding building 9 and coordinates of the relative position or the absolute position of the part in the imaging range R as information capable of specifying the surrounding building 9 in the imaging range R and the part thereof. Names of the surrounding building 9 and the part may be included in the specifying result described above in a case where names of the surrounding building 9 and the part in the imaging range R can also be specified from the design information 53.

The necessity evaluation unit 32A accesses the database 16 on the basis of the specifying result input from the building specifying unit 31A and refers to the maintenance and inspection information 38 (see FIG. 4) corresponding to the part of the surrounding building 9 in the imaging range R. The necessity evaluation unit 32A performs necessity evaluation to evaluate whether or not there is an image acquisition area 17 in which acquisition of new captured image data 13 is necessary in the part of the surrounding building 9 in the imaging range R on the basis of whether or not the "Inspection history information" and the "Repair history information" in the maintenance and inspection information 38 that has been referred to are registered and quality thereof.

Specifically, the necessity evaluation unit 32A performs the necessity evaluation described with reference to FIG. 5 as described above for each piece of maintenance and inspection information 38 corresponding to the part of the surrounding building 9 in the imaging range R. The necessity evaluation unit 32A need not to acquire new captured image data 13 for the part of the surrounding building 9 in which the corresponding maintenance and inspection information 38 has been evaluated as YES in all of steps S1 to S3 among the parts of the surrounding buildings 9 in the imaging range R, and evaluates that the part of the surrounding building 9 does not correspond to the image acquisition area 17 (step S4). Further, the necessity evaluation unit 32A similarly need not to acquire new captured image data 13 for the part of the surrounding building 9 in which the corresponding maintenance and inspection information 38 has been evaluated as YES in all of steps S5 to S7 or all of steps S8 to S10, and evaluates that the part of the surrounding building 9 does not correspond to the image acquisition area 17 (step S4).

In a case where there is the part in which the corresponding maintenance and inspection information 38 has been evaluated as NO in any one of steps S8 to S10 among the parts of the surrounding buildings 9 in the imaging range R, the necessity evaluation unit 32A evaluates that the part of the surrounding building 9 corresponds to the image acquisition area 17 in which acquisition of new captured image data 13 is necessary (step S11).

Figure 10:
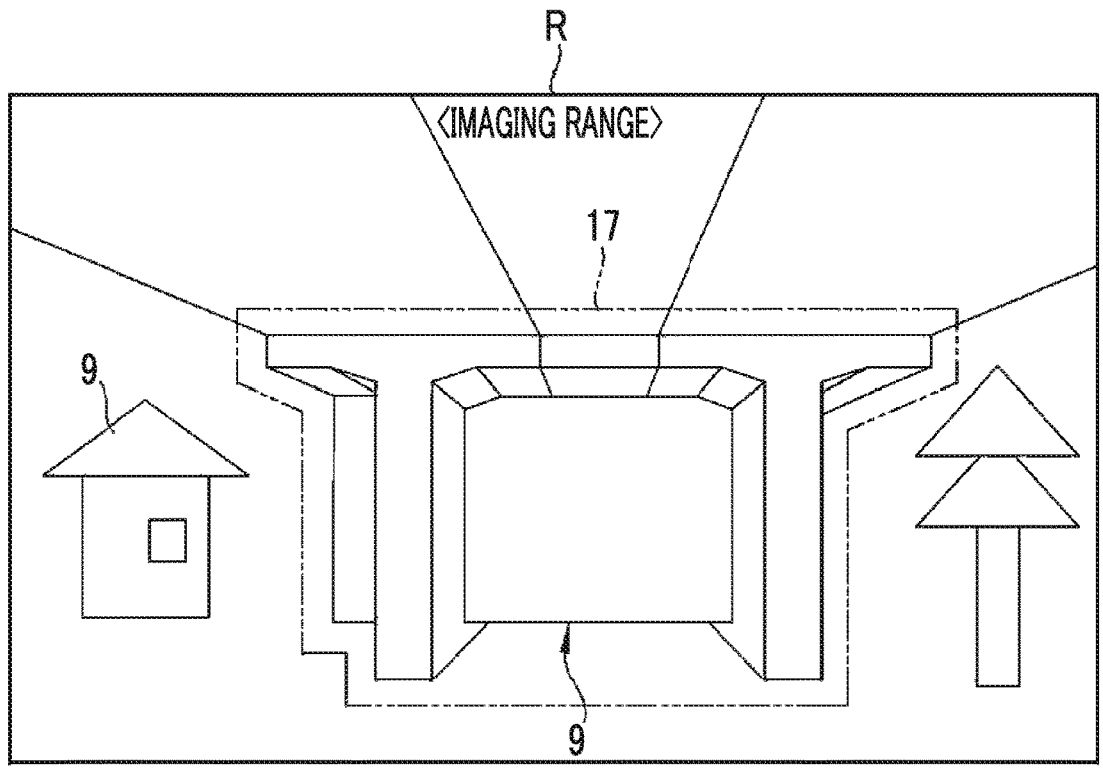
FIG. 10 is an illustrative diagram illustrating an image acquisition area of the second embodiment.

FIG. 10 is an illustrative diagram illustrating the image acquisition area 17 of the second embodiment. As illustrated in FIG. 10, since the necessity evaluation unit 32A of the second embodiment performs the necessity evaluation in units of the parts of the surrounding building 9 in the imaging range R, it can be evaluated whether or not there is the image acquisition area 17 in which acquisition of new captured image data 13 is necessary in units of the parts of the surrounding building 9 in the imaging range R. Accordingly, for example, it can be discriminated that a pier in a bridge in the imaging range R is the image acquisition area 17 in which acquisition of new captured image data 13 is necessary. The necessity evaluation unit 32A outputs an evaluation result of the necessity evaluation to the image acquisition area information output unit 33.

Referring back to FIG. 9, in a case where there is the image acquisition area 17 in which acquisition of new captured image data 13 is necessary in the part of the surrounding building 9 in the imaging range R of the imaging terminal 12, the image acquisition area information output unit 33 of the second embodiment generates the image acquisition area information 17A indicating this image acquisition area 17 on the basis of the evaluation result of the necessity evaluation input from the necessity evaluation unit 32A. The image acquisition area information 17A includes information indicating the position and the shape of the image acquisition area 17 in the imaging range R of the imaging terminal 12, as in the first embodiment. The image acquisition area information output unit 33 outputs the generated image acquisition area information 17A to the imaging terminal 12 that is an output source of the specifying information 15 or the like, as in the first embodiment described above.

A configuration for performing a process after the output of the image acquisition area information 17A to the imaging terminal 12 is basically the same as that in the first embodiment. In a case where the image acquisition area information 17A is input from the image acquisition area information acquisition unit 42, the display control unit 43 of the imaging terminal 12 of the second embodiment causes the display unit 44 to discriminably display the image acquisition area 17 on a live view image on the basis of the image acquisition area information 17A.

Figure 11:
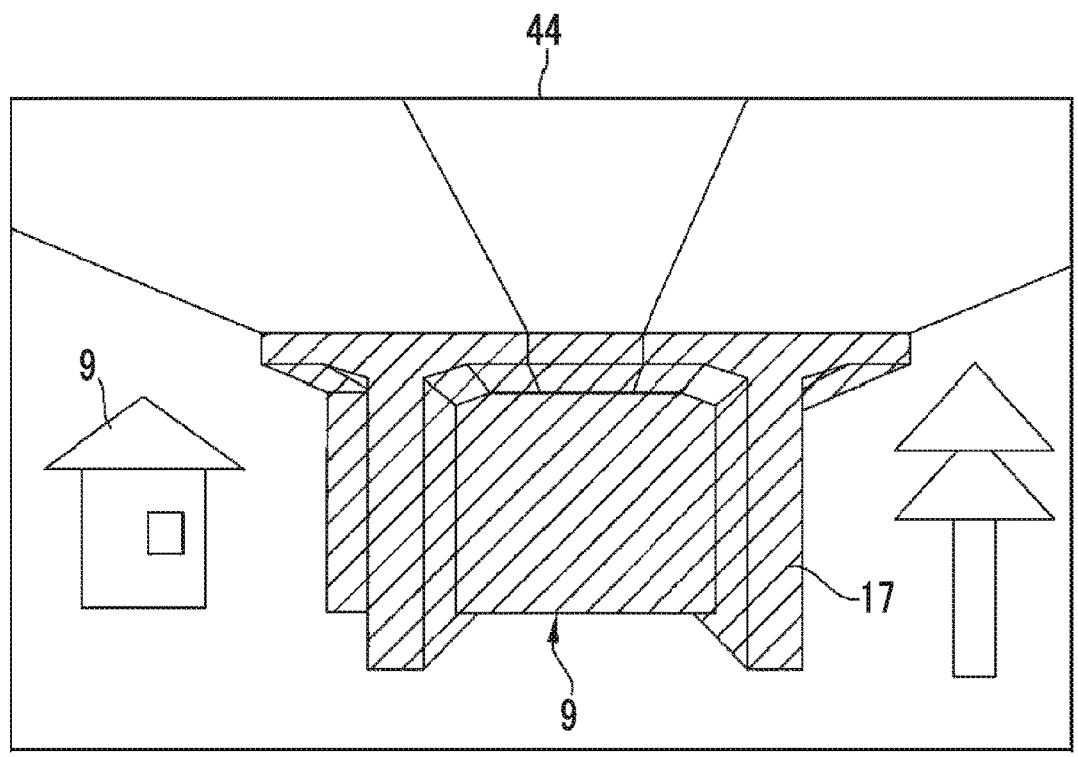
FIG. 11 is an illustrative diagram illustrating an example of an image acquisition area that is displayed on a live view image in a display unit of an imaging terminal of the second embodiment.

FIG. 11 is an illustrative diagram illustrating an example of the image acquisition area 17 that is displayed on the live view image by the display unit 44 of the imaging terminal 12 of the second embodiment. As illustrated in FIG. 11, in the second embodiment, since the necessity evaluation is performed in units of the parts of the surrounding building 9 in the imaging range R, it is possible to change a display aspect of the part corresponding to the image acquisition area 17 among the parts of the surrounding building 9 in the imaging range R. Since a configuration for performing subsequent processes is basically the same as that in the first embodiment described above, specific description thereof will be omitted.

[Operation of Imaging Support System of Second Embodiment]

Figure 12:
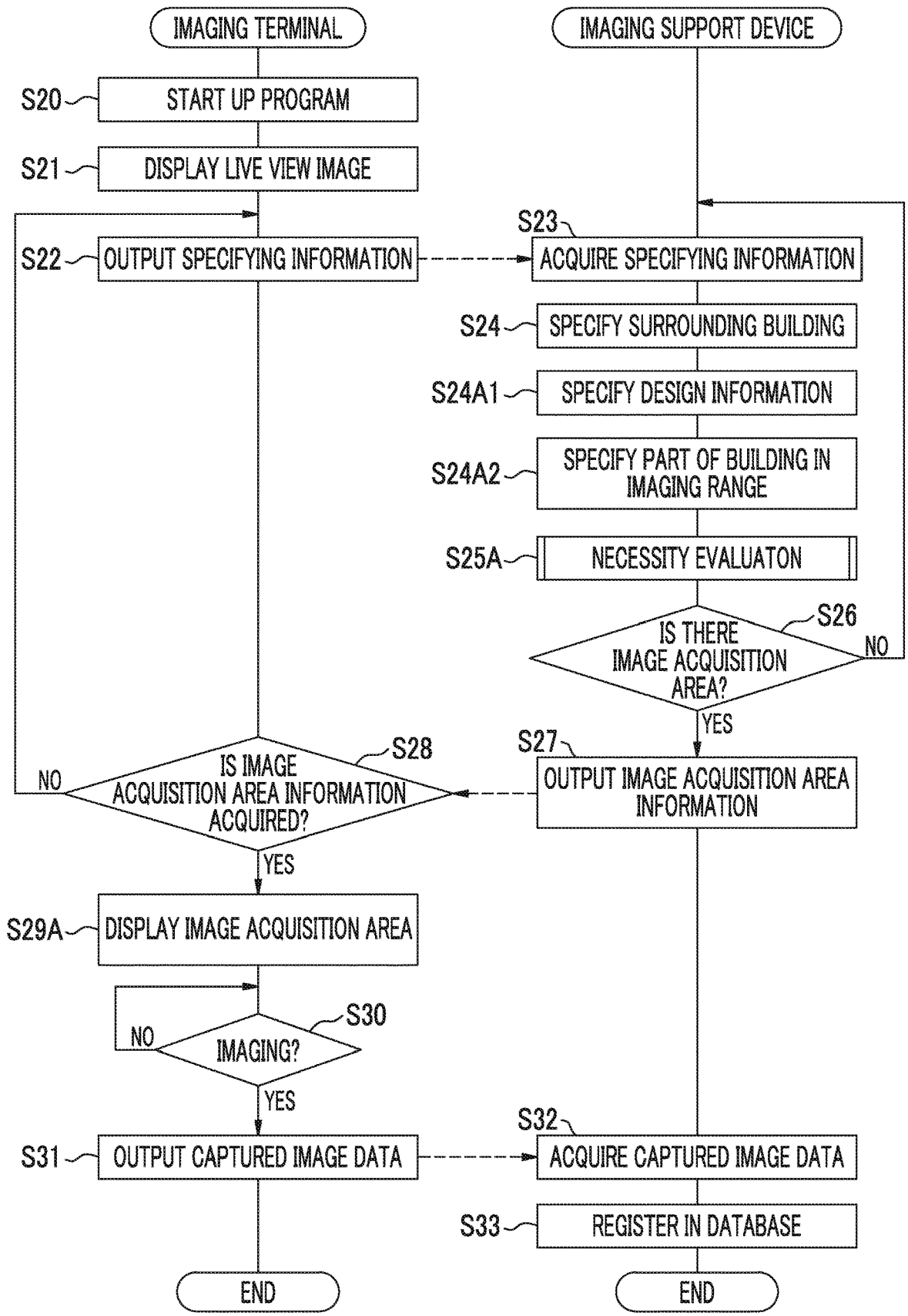
FIG. 12 is a flowchart illustrating a flow of an imaging support process for an imaging terminal in the imaging support system of the second embodiment.

Next, an operation of the imaging support system (the imaging support device 14A) of the second embodiment will be described with reference to FIG. 12. FIG. 12 is a flowchart illustrating a flow of an imaging support process (an imaging support method of the present invention) for the imaging terminal 12 in the imaging support system (the imaging support device 14A) of the second embodiment. Since a flow of process from step S20 to step S24 is basically the same as that in the first embodiment illustrated in FIG. 8 described above, specific description thereof will be omitted herein.

<Imaging Support Device According to Second Embodiment>

In step S24, the building specifying unit 31A specifies the surrounding building 9 in the imaging range R of the imaging terminal 12, and then outputs a specifying result to the design information specifying unit 51, as in the first embodiment. Then, the design information specifying unit 51 specifies the design information 53 of the surrounding building 9 in the imaging range R on the basis of the specifying result input from the building specifying unit 31A and the design information 53 of a plurality of buildings acquired from the database 16, and outputs the design information 53 to the building specifying unit 31A (step S24A1). Accordingly, the building specifying unit 31A also specifies the part of the surrounding building 9 in the imaging range R on the basis of the position information and the imaging direction included in the previously acquired specifying information 15 and the design information 53 of the surrounding building 9 in the imaging range R (step S24A2). The building specifying unit 31A outputs the result of specifying the surrounding building 9 in the imaging range R and the part thereof to the necessity evaluation unit 32A.

The necessity evaluation unit 32A that has received an input of the specifying result from the building specifying unit 31A accesses the database 16 on the basis of the specifying result and refers to the maintenance and inspection information 38 corresponding to the part of the surrounding building 9 in the imaging range R. Then, the necessity evaluation unit 32A performs the necessity evaluation described in FIG. 5 described above for each piece of the maintenance and inspection information 38 corresponding to the part of the surrounding building 9 in the imaging range R (step S25A). Accordingly, it is possible to evaluate whether or not there is an image acquisition area 17 in which acquisition of new captured image data 13 is necessary in units of the parts of the surrounding building 9 in the imaging range R. The necessity evaluation unit 32A outputs the evaluation result of the necessity evaluation to the image acquisition area information output unit 33.

Since the process from step S26 to step S28 is basically the same as in the first embodiment illustrated in FIG. 8 described above, specific description thereof will be omitted herein.

<Imaging Terminal of Second Embodiment>

In the case of "YES" in step S28, the display control unit 43 of the imaging terminal 12 discriminates a position and a shape of the image acquisition area 17 in the display surface of the display unit 44 on the basis of the image acquisition area information 17A input from the image acquisition area information acquisition unit 42. The display control unit 43 changes a display aspect of a portion corresponding to the image acquisition area 17 within the live view image displayed on the display unit 44, as illustrated in FIG. 11 described above on the basis of a result of the discrimination of the position and the shape of the image acquisition area 17. Accordingly, the image acquisition area 17 is discriminably displayed on the live view image displayed on the display unit 44 (step S29A). As a result, the user of the imaging terminal 12 can discriminate whether or not there is the image acquisition area 17 in which acquisition of new captured image data 13 is necessary in the part of the surrounding building 9 in the imaging range R.

Since the process after step S30 is basically the same as in the first embodiment illustrated in FIG. 8 described above, specific description thereof will be omitted herein.

[Effects of Second Embodiment]

As described above, in the imaging support system (the imaging support device 14A) of the second embodiment, since the necessity evaluation as to whether or not there is the image acquisition area 17 in which acquisition of new captured image data 13 is necessary is performed in units of the parts of the surrounding building 9 in the imaging range R, the display of the image acquisition area 17 in the imaging terminal 12 can be performed in units of the parts of the surrounding building 9 in the imaging range R. Accordingly, the user of the imaging terminal can easily discriminate which part of the surrounding building 9 in the imaging range R may be imaged. As a result, as in the first embodiment, it is possible to request the user of the imaging terminal 12 to image the image acquisition area 17, and therefore, it is possible to efficiently acquire the captured image data 13 of the building in which imaging is necessary from the imaging terminal 12 of the ordinary person and register the captured image data 13 in the database 16.

[Modification Example of Imaging Support System (Imaging Support Device) of Second Embodiment]

Next, a modification example of the imaging support system of the second embodiment will be described. In this modification example, the method of specifying the surrounding building 9 in the imaging range R and the part thereof are different from in the second embodiment.

Figure 13:
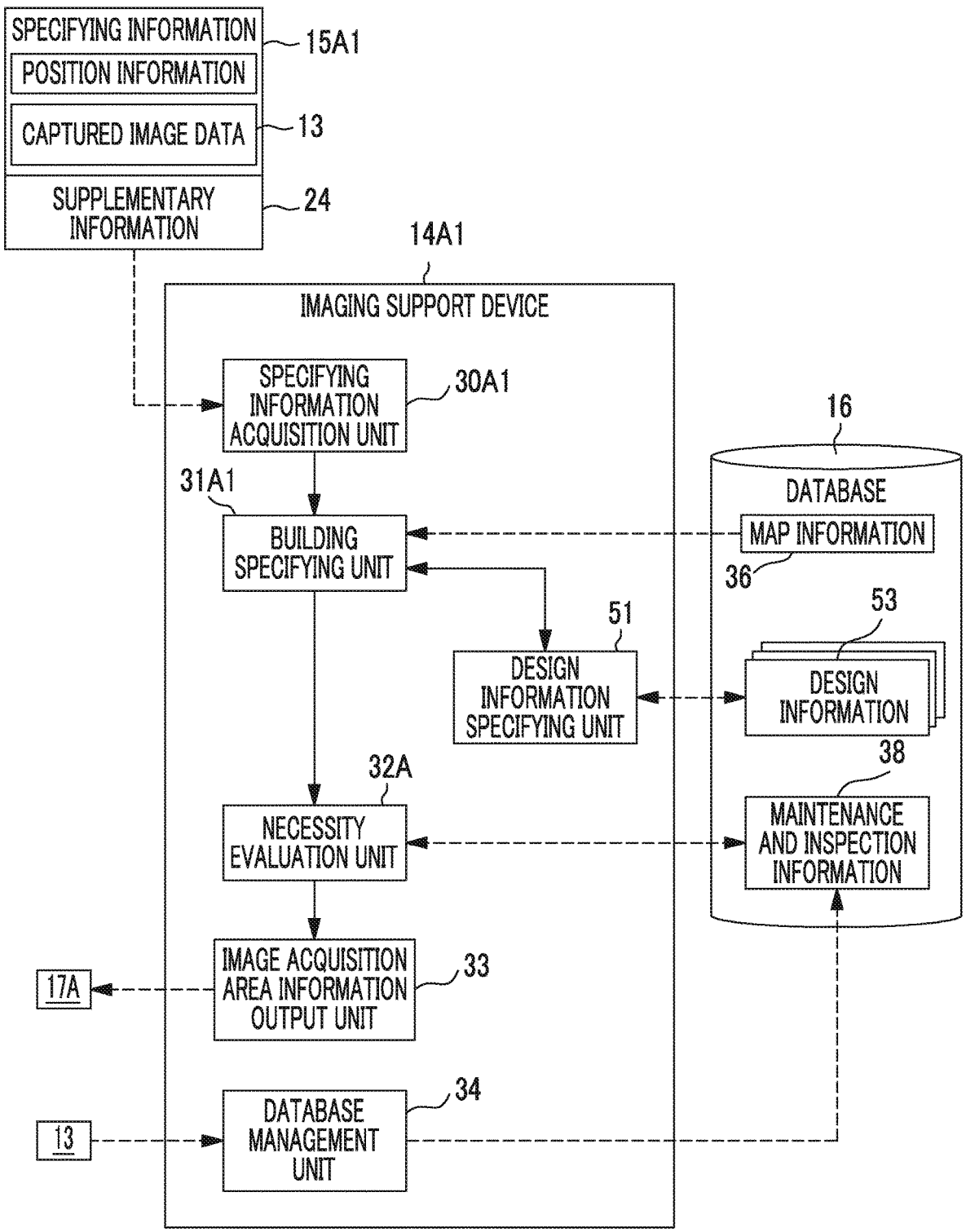
FIG. 13 is a block diagram illustrating a configuration of an imaging support device that is used in a modification example of the imaging support system of the second embodiment.

FIG. 13 is a block illustrating a configuration of an imaging support device 14A1 that is used in a modification example of the imaging support system of the second embodiment. The imaging support system of the modification example of the second embodiment has basically the same configuration as that of the second embodiment except that the imaging support device 14A1 includes a specifying information acquisition unit 30A1 and a building specifying unit 31A1. Therefore, the same functions or configurations as those of the second embodiment are denoted with the same reference numerals, and description thereof will be omitted.

As illustrated in FIG. 13, the specifying information acquisition unit 30A1 of the imaging support device 14A1 acquires specifying information 15A1 and supplementary information 24 from the imaging terminal 12. This specifying information 15A1 includes the above-described position information and the captured image data 13 for a live view display captured by the imaging unit 22 of the imaging terminal 12. Although not illustrated, in the modification example of the imaging support system of the second embodiment, the specifying information output unit 41 (see FIG. 2) of the imaging terminal 12 outputs the specifying information 15A1 including the position information acquired by the position information acquisition unit 20 and the captured image data 13 for a live view display captured by the imaging unit 22 to the imaging support device 14A1.

The building specifying unit 31A1 acquires the design information 53 of the surrounding building 9 in the imaging range R from the design information specifying unit 51 by specifying the surrounding building 9 in the imaging range R of the imaging terminal 12 and outputting a specifying result to the design information specifying unit 51, similar to the building specifying unit 31A of the second embodiment. It is assumed that data indicating appearance shapes of a plurality of buildings (including the surrounding building 9) and respective parts thereof have been registered in the design information 53 in this example.

The building specifying unit 31A1 analyzes the captured image data 13 included in the specifying information 15A1 acquired from the specifying information acquisition unit 30A1 and specifies the captured image data 13, that is, the surrounding building 9 included in the imaging range R of the imaging terminal 12. As a method of specifying the surrounding building 9 in the captured image data 13 (imaging range R), for example, a method of performing template matching using external shape data of the surrounding building 9 included in the acquired design information 53 as a template image and searching for (extracting) a surrounding building having a matching appearance shape from the captured image data 13 is used.

Then, the building specifying unit 31A1, for example, performs template matching using external shape data of each part of the surrounding building 9 included in the design information 53 as a template image on the basis of the design information 53 of the surrounding building 9 in the specified imaging range R, and searches for a part having a matching appearance shape from the captured image data 13 to specify the part of the surrounding building 9 in the imaging range R.

In this example, the template matching method has been exemplified as a method of specifying the surrounding building 9 in the imaging range R and the part thereof from the captured image data 13, but the specifying method is not limited to the template matching method.

Thus, the building specifying unit 31A1 of the modification example of the second embodiment can specify the surrounding building 9 in the imaging range R of the imaging unit 22 of the imaging terminal 12 and the part thereof, similar to the building specifying unit 31A of the second embodiment. The building specifying unit 31A1 outputs a result of specifying the surrounding building 9 in the imaging range R and the part thereof to the necessity evaluation unit 32A.

Since a configuration for performing a subsequent process is basically the same as that of the second embodiment described above, specific description thereof will be omitted. Accordingly, the same effect as that of the second embodiment can be obtained. In a case where the building specifying unit 31 of the first embodiment specifies the surrounding building 9 in the imaging range R, the building specifying unit 31 may perform specifying using the position information acquired from the imaging terminal 12 and the captured image data 13, similar to the modification example of the second embodiment.

[Imaging Support System of Third Embodiment]

Figure 14:
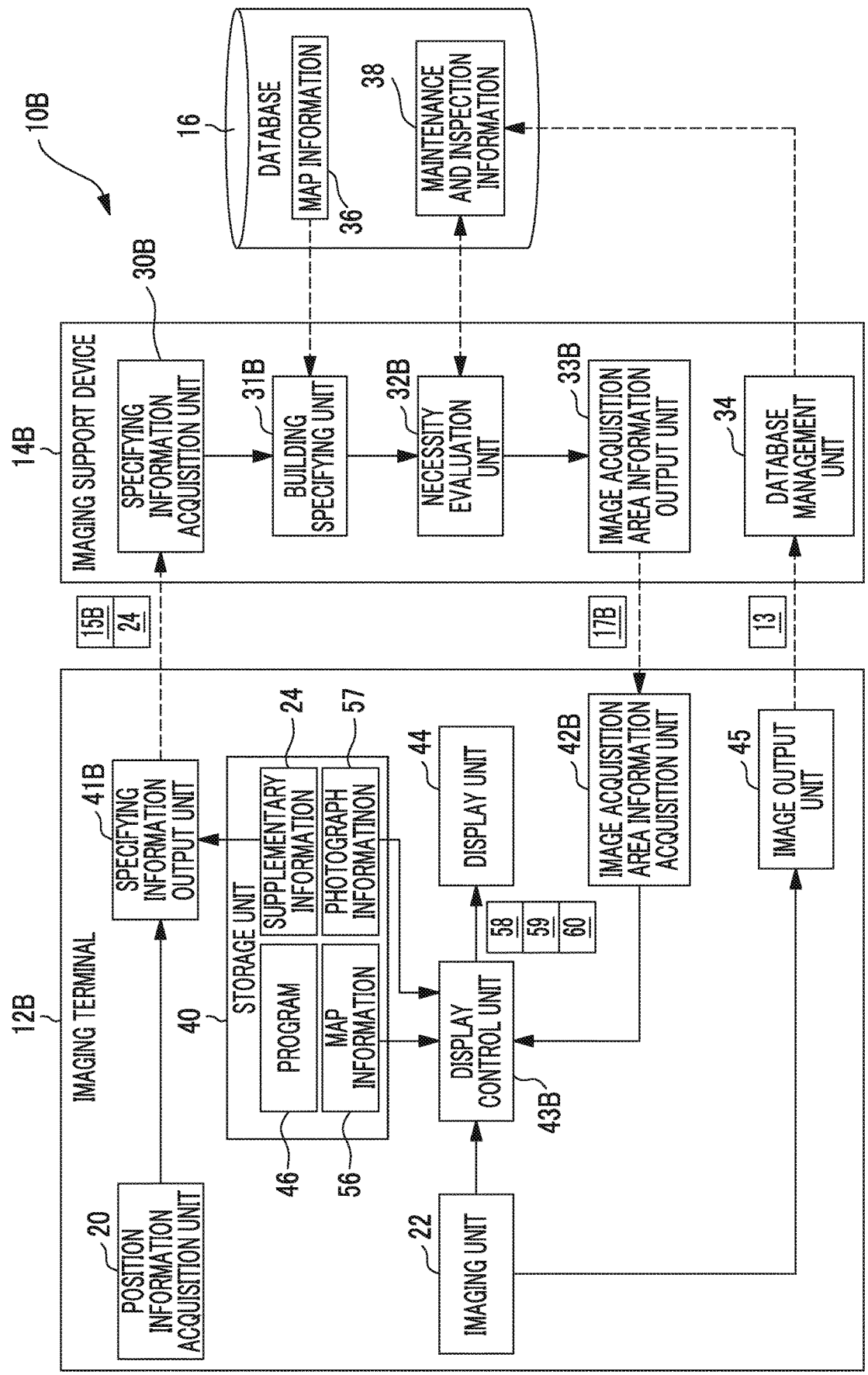
FIG. 14 is a block diagram illustrating a configuration of an imaging support system of a third embodiment.

Next, an imaging support system 10B of the third embodiment of the present invention will be described with reference to FIG. 14. FIG. 14 is a block diagram illustrating a configuration of the imaging support system 10B of the third embodiment. In each of the above-described embodiments, the image acquisition area 17 is discriminably displayed on the live view image displayed on the display unit 44, whereas in the imaging support system 10B of the third embodiment, a map indicating a position of the image acquisition area 17 is displayed on the display unit 44. The imaging support system 10B includes an imaging terminal 12B and an imaging support device 14B. The same functions or configurations as those in each of the above embodiments are denoted with the same reference numerals, and description thereof will be omitted.

<Imaging Support Device of Third Embodiment>

The imaging support device 14B of the third embodiment includes a specifying information acquisition unit 30B, a building specifying unit 31B corresponding to an inspection target specifying unit of the present invention, a necessity evaluation unit 32B, an image acquisition area information output unit 33B, and a database management unit 34.

The specifying information acquisition unit 30B acquires the specifying information 15B including the position information of the imaging terminal 12B and the supplementary information 24 from the imaging terminal 12B and outputs the acquired specifying information 15B to the building specifying unit 31B. Further, the specifying information acquisition unit 30B outputs the supplementary information 24 to the image acquisition area information output unit 33B, as in the first embodiment.

The building specifying unit 31B specifies the surrounding building 9 of the imaging terminal 12B as in the first embodiment on the basis of the specifying information 15B input from the specifying information acquisition unit 30B and the map information 36 acquired from the database 16, and outputs the specifying result to the necessity evaluation unit 32B.

The necessity evaluation unit 32B accesses the database 16 on the basis of the specifying result of the surrounding building 9 input from the building specifying unit 31B and refers to the maintenance and inspection information 38 (see FIG. 4) corresponding to the surrounding building 9. In this case, since the maintenance and inspection information 38 of this example is registered in the database 16 for each part of the surrounding building 9, the necessity evaluation unit 32B refers to the maintenance and inspection information 38 corresponding to all parts of the surrounding building 9.

Then, the necessity evaluation unit 32B performs the necessity evaluation described with reference to FIG. 5 as described above, for each piece of maintenance and inspection information 38 corresponding to each part of the surrounding building 9. Specifically, the necessity evaluation unit 32B need not to acquire new captured image data 13 for the part of the surrounding building 9 in which the corresponding maintenance and inspection information 38 has been evaluated as YES in all of steps S1 to S3 illustrated in FIG. 5 described above among the parts of the surrounding buildings 9 in the imaging range R, and evaluates that the part of the surrounding building 9 does not correspond to the image acquisition area 17 (step S4). Further, the necessity evaluation unit 32B similarly need not to acquire new captured image data 13 for the part of the surrounding building 9 in which the corresponding maintenance and inspection information 38 has been evaluated as YES in all of steps S5 to S7 or all of steps S8 to S10, and evaluates that the part of the surrounding building 9 does not correspond to the image acquisition area 17 (step S4).

In a case where there is the part of the surrounding buildings 9 in which the corresponding maintenance and inspection information 38 has been evaluated as NO in any one of steps S8 to S10 among the parts of the surrounding buildings 9 in the imaging range R, the necessity evaluation unit 32B evaluates that the part of the surrounding building 9 corresponds to the image acquisition area 17 in which acquisition of new captured image data 13 is necessary (step S11). The necessity evaluation unit 32B outputs the evaluation result of the necessity evaluation to the image acquisition area information output unit 33B.

In a case where there is the image acquisition area 17 in which acquisition of new captured image data 13 is necessary in the part of the surrounding building 9, the image acquisition area information output unit 33B generates the image acquisition area information 17B indicating this image acquisition area 17 on the basis of the evaluation result of the necessity evaluation input from the necessity evaluation unit 32B.

The image acquisition area information 17B includes information capable of specifying the position of the surrounding building 9 at which the image acquisition area 17 exists on the map, and information capable of specifying the part of the surrounding building 9 evaluated to correspond to the image acquisition area 17 in the surrounding building 9. For example, in this example, the "Building information" illustrated in FIG. 4 is used as the information capable of specifying the position on the map of the surrounding building 9, and the "Part information" illustrated in FIG. 4 as described above is used as the information capable of specifying the part of the surrounding building 9 evaluated to correspond to the image acquisition area 17. The image acquisition area information output unit 33B outputs the generated image acquisition area information 17B to the imaging terminal 12B that is an output source of the specifying information 15B or the like on the basis of the supplementary information 24 previously acquired from the specifying information acquisition unit 30B.

<Imaging Terminal of Third Embodiment>

The imaging terminal 12B of the third embodiment includes a position information acquisition unit 20, an imaging unit 22, a storage unit 40, a specifying information output unit 41B, an image acquisition area information acquisition unit 42B, a display control unit 43B, a display unit 44, and an image output unit 45.

The storage unit 40 stores the above-described program 46 for causing the imaging terminal 12B to function as a part of the imaging support system 10B, the above-described supplementary information 24, the map information 56, and the photograph information 57. The map information 56 is basically the same as the map information 36 described above, and indicates positions of a plurality of buildings (including the surrounding buildings 9). The photograph information 57 is photograph image data obtained by imaging the plurality of buildings and respective parts thereof in advance. As the photograph information 57, for example, image data from which appearances of the plurality of buildings and the respective parts thereof can be recognized, such as image data obtained by drawing the plurality of buildings and the respective parts thereof using computer graphics, may be used.

The specifying information output unit 41B outputs the specifying information 15B including the position information acquired by the position information acquisition unit 20, and the supplementary information 24 acquired from the storage unit 40 to the imaging support device 14B under the control of the program 46. Accordingly, since the specifying information acquisition unit 30B of the imaging support device 14B acquires the specifying information 15B and the supplementary information 24, the image acquisition area information 17B described above is output from the image acquisition area information output unit 33B of the imaging support device 14B to the imaging terminal 12B.

The image acquisition area information acquisition unit 42B is basically the same as the image acquisition area information acquisition unit 42 of the first embodiment, and acquires the image acquisition area information 17B output from the image acquisition area information output unit 33B, and outputs the image acquisition area information 17B to the display control unit 43B under the control of the program 46.

In a case where the imaging terminal 12B perform imaging, the display control unit 43B causes the display unit 44 to display a live view image on the basis of the captured image data 13 sequentially input from the imaging unit 22, as in the first embodiment.

On the other hand, in a case where the image acquisition area information 17B is input from the image acquisition area information acquisition unit 42B, the display control unit 43B generates the image acquisition area display map data 58 (see FIG. 15) on the basis of the image acquisition area information 17B and the map information 56 acquired from the storage unit 40 under the control of the program 46. This image acquisition area display map data 58 corresponds to an image acquisition area display map of the present invention, and indicates the position of the surrounding building 9 including the image acquisition area 17 on the map and the position of the imaging terminal 12. The position of the imaging terminal 12 can be acquired from the position information acquisition unit 20.

Further, the display control unit 43B acquires the photograph information 57 corresponding to the "Building information" described above included in the image acquisition area information 17B from the storage unit 40, and generates the entire surrounding building image data 59 (see FIG. 15) indicating the position of the image acquisition area 17 in the entire surrounding building 9 on the basis of the photograph information 57 under the control of the program 46. Further, the display control unit 43B acquires the photograph information 57 corresponding to the "Part information" described above included in the image acquisition area information 17B from the storage unit 40 and generates enlarged image data 60 (see FIG. 15) obtained by enlarging the image acquisition area 17 in the surrounding building 9 on the basis of the photograph information 57 under the control of the program 46.

Figure 15:
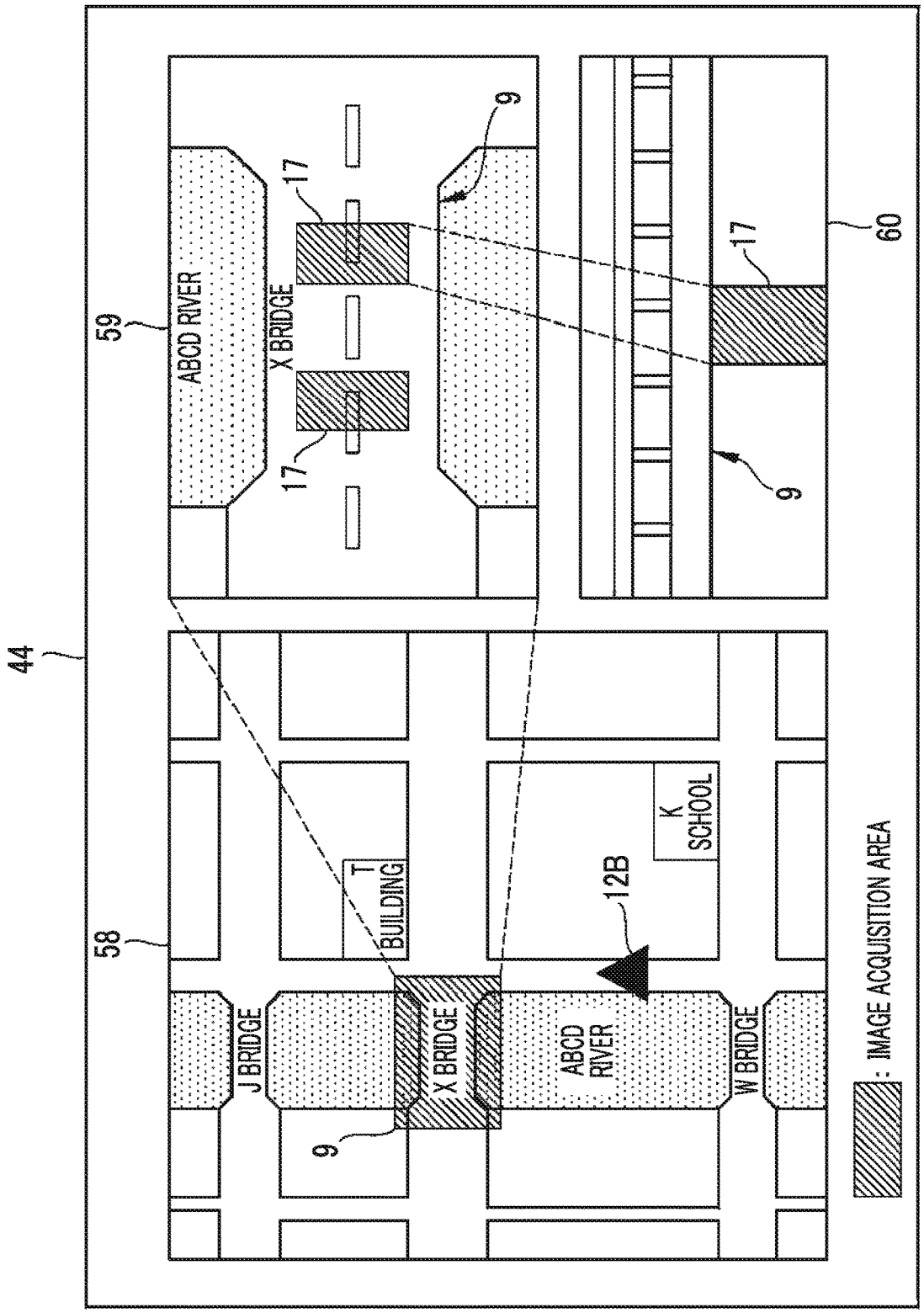
FIG. 15 is an illustrative diagram illustrating an example of image acquisition area display map data, entire surrounding building image data, and enlarged image data that are displayed on a display unit.

In the image acquisition area display map data 58, the entire surrounding building image data 59, and the enlarged image data 60, a display aspect of a portion corresponding to the image acquisition area 17 is made different from other portions (see FIG. 15). The display control unit 43B causes the display unit 44 to display the image acquisition area display map data 58, the entire surrounding building image data 59, and the enlarged image data 60.

FIG. 15 is an illustrative diagram illustrating an example of the image acquisition area display map data 58, the entire surrounding building image data 59, and the enlarged image data 60 displayed on the display unit 44. As illustrated in FIG. 15, a positional relationship between the surrounding building 9 including the image acquisition area 17 and the imaging terminal 12B is indicated by the image acquisition area display map data 58. The position of the image acquisition area 17 in the entire surrounding building 9 is indicated by the entire surrounding building image data 59. An appearance of the image acquisition area 17 of the imaging target is indicated by the enlarged image data 60. Accordingly, the image acquisition area 17 can be discriminably displayed on the display unit 44. As a result, it is possible to request the user of the imaging terminal 12B to image the image acquisition area 17.

Since a configuration for performing a subsequent process is basically the same as that in the first embodiment described above, specific description thereof will be omitted.

[Operation of Imaging Support System of Third Embodiment]

Figure 16:
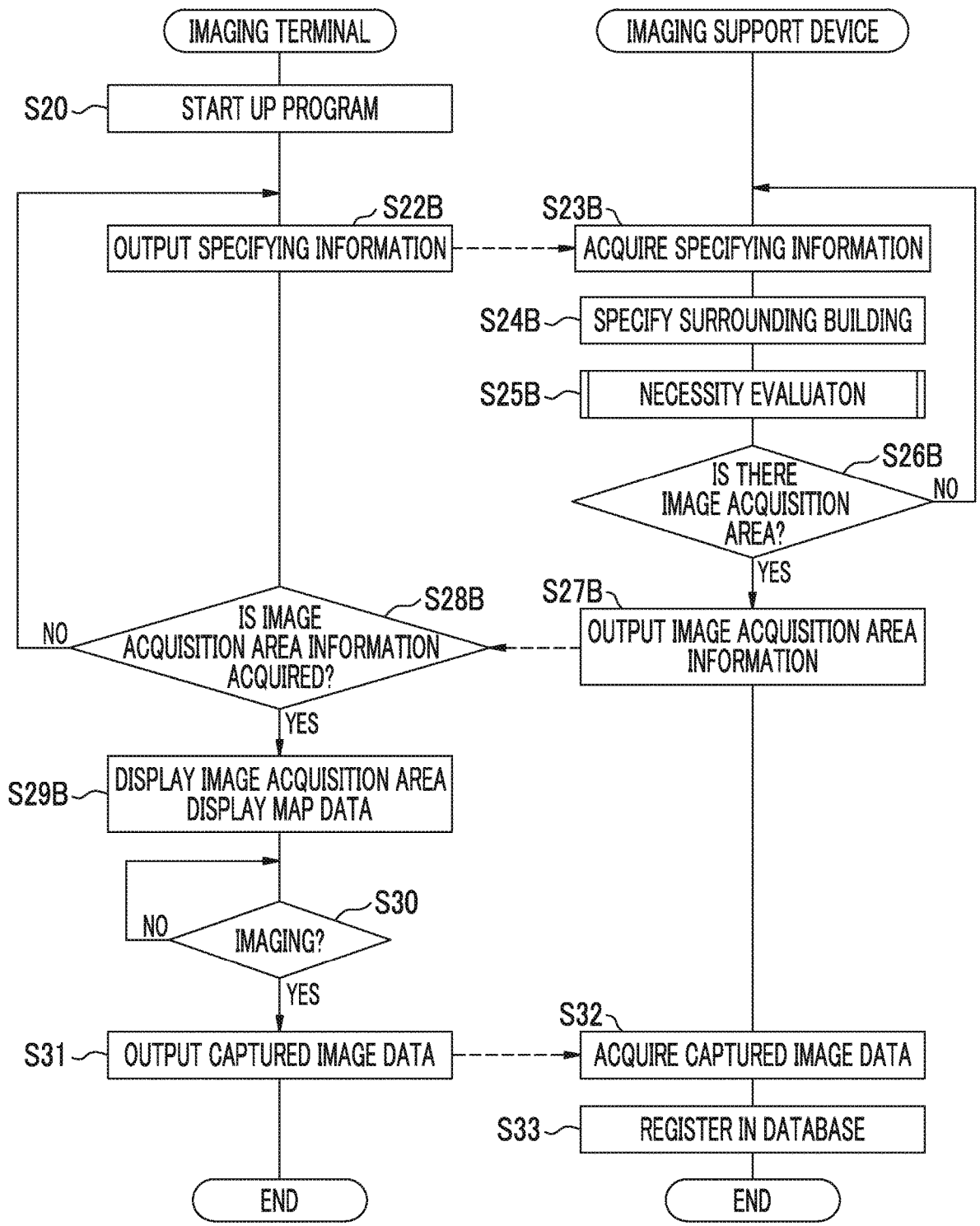
FIG. 16 is a flowchart illustrating a flow of an imaging support process for an imaging terminal in the imaging support system of the third embodiment.

Next, an operation of the imaging support system 10B (the imaging support device 14B) of the third embodiment will be described with reference to FIG. 16. FIG. 16 is a flowchart illustrating a flow of the imaging support process (the imaging support method of the present invention) for the imaging terminal 12B in the imaging support system 10B (the imaging support device 14B) of the third embodiment.

<Output of Specifying Information from Imaging Terminal of Third Embodiment>

In a case where the program 46 is executed in the imaging terminal 12B (step S20), the specifying information output unit 41B outputs the specifying information 15B including the position information acquired from the position information acquisition unit 20 and the supplementary information 24 acquired from the storage unit 40 to the imaging support device 14B under the control of the program 46 (step S22 B).

<Necessity Evaluation in Imaging Support Device of Third Embodiment>

The specifying information acquisition unit 30B of the imaging support device 14B acquires the specifying information 15B and the supplementary information 24 output from the imaging terminal 12B (step S23B). The specifying information acquisition unit 30 B outputs the acquired specifying information 15 B to the building specifying unit 31B, and outputs the acquired supplementary information 24 to the image acquisition area information output unit 33B.

The building specifying unit 31B which has received an input of the specifying information 15B from the specifying information acquisition unit 30B specifies the surrounding building 9 of the imaging terminal 12 on the basis of the specifying information 15B (position information) and the map information 36 acquired from the database 16, and outputs a specifying result to the necessity evaluation unit 32B (step S24B).

The necessity evaluation unit 32B which has received an input of the specifying result from the building specifying unit 31B accesses the database 16 and refers to the maintenance and inspection information 38 corresponding to all parts of the surrounding building 9. Then, the necessity evaluation unit 32B performs the necessity evaluation described with reference to FIG. 5 described above, for each piece of maintenance and inspection information 38 corresponding to each part of the surrounding building 9 (step S25B). The necessity evaluation unit 32B outputs an evaluation result of necessity evaluation to the image acquisition area information output unit 33B.

In a case where there is the image acquisition area 17 in which acquisition of new captured image data 13 is necessary in the part of the surrounding building 9, the image acquisition area information output unit 33B which has received the evaluation result of the necessity evaluation from the necessity evaluation unit 32B generates image acquisition area information 17B indicating this image acquisition area 17 (YES in step S26B). The image acquisition area information output unit 33B outputs the image acquisition area information 17B to the imaging terminal 12B that is an output source of the specifying information 15 or the like on the basis of the previously acquired supplementary information 24 (step S27B).

<Display of Image Acquisition Area in Imaging Terminal of Third Embodiment>

In a case where the image acquisition area information 17B is output from the imaging support device 14B, the image acquisition area information acquisition unit 42B of the imaging terminal 12B acquires the image acquisition area information 17B and outputs the image acquisition area information 17B to the display control unit 43B (step YES in S28B).

The display control unit 43B which has received an input of the image acquisition area information 17B from the image acquisition area information acquisition unit 42B generates the image acquisition area display map data 58 on the basis of the image acquisition area information 17B and the map information 56 acquired from the storage unit 40. Further, the display control unit 43B acquires the photograph information 57 corresponding to the "Building information" and the "Part information" included in the image acquisition area information 17B from the storage unit 40, and generates the entire surrounding building image data 59 and the enlarged image data 60 on the basis of the photograph information 57.

Then, as illustrated in FIG. 15 described above, the display control unit 43B causes the display unit 44 to display the image acquisition area display map data 58, the entire surrounding building image data 59, and the enlarged image data 60 (step S29B). Accordingly, a positional relationship between the surrounding building 9 including the image acquisition area 17 and the imaging terminal 12B, the position of the image acquisition area 17 in the surrounding building 9, and the appearance of the image acquisition area 17 are displayed on the display unit 44. As a result, since the image acquisition area 17 is discriminably displayed on the display unit 44, it is possible to request the user of the imaging terminal 12B to image the image acquisition area 17.

Since a process after step S30 is basically the same as in the first embodiment illustrated in FIG. 8 described above, s specific description thereof will be omitted herein.

[Effects of Third Embodiment]

As described above, since the image acquisition area display map data 58 indicating the position on the map of the image acquisition area 17 in which the acquisition of new captured image data 13 is evaluated to be necessary, or the like, is displayed on the display unit 44 of the imaging terminal 12B in the imaging support system 10B of the third embodiment, it is possible to request the user of the imaging terminal 12B to image the image acquisition area 17. As a result, it is possible to efficiently acquire the captured image data 13 of the building in which imaging is necessary from the imaging terminal 12B of the ordinary person and register the captured image data 13 in the database 16.

<Modification Example of Third Embodiment>

Although the image acquisition area display map data 58, the entire surrounding building image data 59, and the enlarged image data 60 are generated by the display control unit 43B of the imaging terminal 12B in the third embodiment, such data maybe generated in the image acquisition area information output unit 33B of the imaging support device 14B and output to the imaging terminal 12B as the image acquisition area information 17B described above.

[Imaging Support System of Fourth Embodiment]

Figure 17:
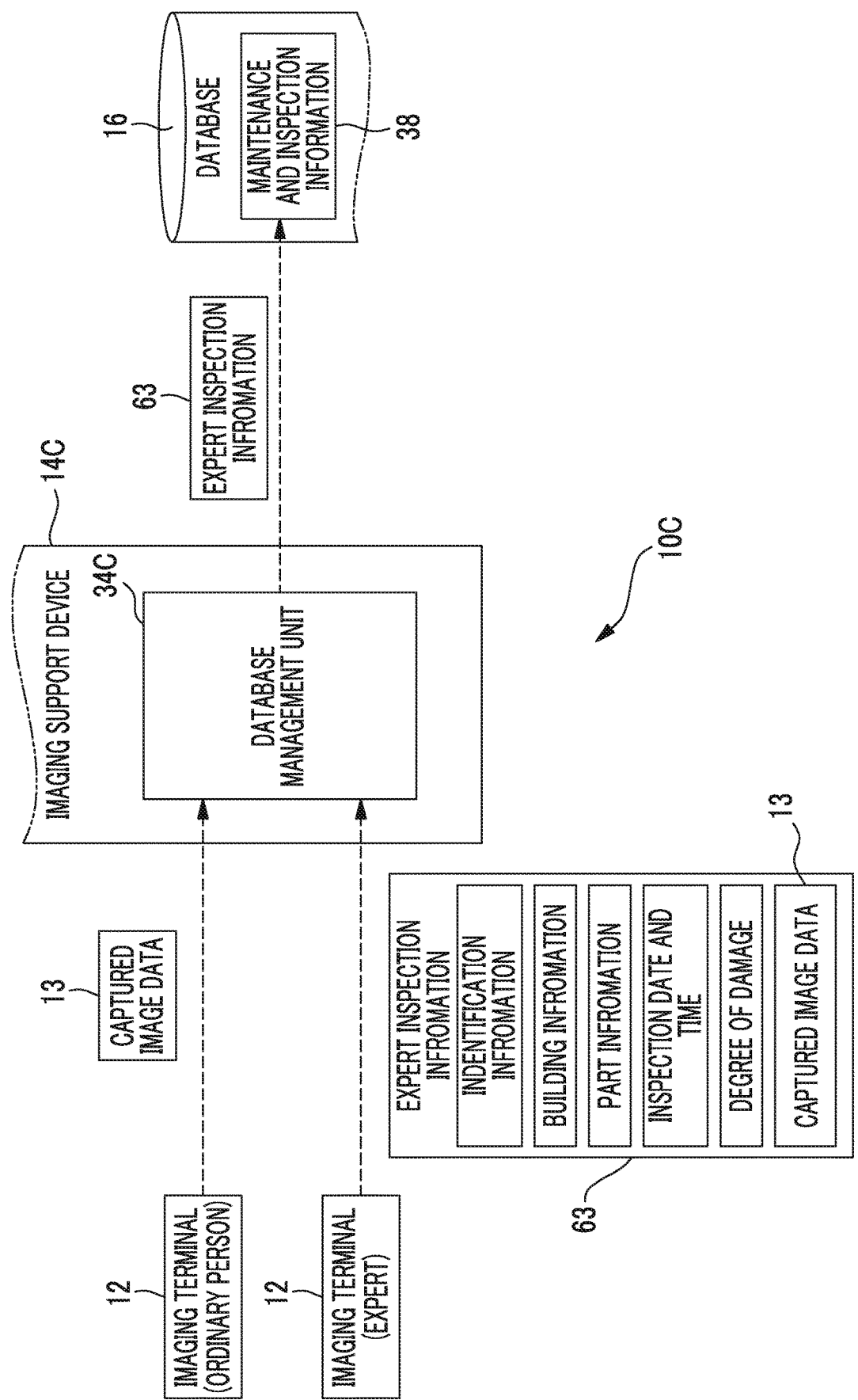
FIG. 17 is a block diagram illustrating a configuration of an imaging support system of a fourth embodiment.

Next, an imaging support system 10C of the fourth embodiment of the present invention will be described with reference to FIG. 17. FIG. 17 is a block diagram illustrating a configuration of the imaging support system 10C of the fourth embodiment. In each of the above embodiments, the captured image data 13 of the image acquisition area 17 acquired from the imaging terminal 12 or 12B of the ordinary person is registered in the "Non-expert acquisition history" of the maintenance and inspection information 38 in the database 16 by the database management unit 34. In this case, an inappropriate captured image data 13, for example, in which image quality (resolution, exposure, distortion, blur, bokeh, or the like) is not appropriate or a size or the like of the image acquisition area 17 is not appropriate is likely to be included in the captured image data 13 of the image acquisition area 17 captured by the ordinary person.

Therefore, in the imaging support system 10C of the fourth embodiment, in a case where the captured image data 13 of the image acquisition area 17 captured by the expert is registered in the maintenance and inspection information 38 in the database 16, information (the captured image data 13 or the like) registered in the "Non-expert acquisition history" in the maintenance and inspection information 38 is erased.

The imaging support system 10C of the fourth embodiment includes an imaging terminal 12 of an ordinary person and an expert corresponding to a predetermined specific user of the present invention, and an imaging support device 14C. The imaging support system 10C has basically the same configuration as the imaging support system of each of the above embodiments except that the imaging support device 14C includes a database management unit 34C. Therefore, the same functions or configurations as those of the above embodiments are denoted with the same reference numerals, and the description thereof will be omitted.

In addition to acquiring the captured image data 13 of the image acquisition area 17 from the imaging terminal 12 of the ordinary person as in each of the above embodiments, the database management unit 34C acquires expert inspection information 63 indicating the inspection result from the imaging terminal 12 of the expert who has performed inspection of each part of the surrounding building 9, and registers the expert inspection information 63 in the maintenance and inspection information 38 in the database 16.

The expert inspection information 63 includes "identification information" such as an ID from which an expert can be identified, "Building information" and "Part information" (see FIG. 4) from which the building and the part thereof on which the inspection has been performed can be identified, "Inspection date and time" which is date and time when the inspection has been performed, "Captured image data 13" of the part of the building on which the inspection has been performed, and a "Degree of damage" obtained by evaluating a degree of damage occurring at the part of the building on which the inspection has been performed. In addition to the "identification information" and the "Captured image data 13", a type of information included in the expert inspection information 63 is not particularly limited.

Figure 18:
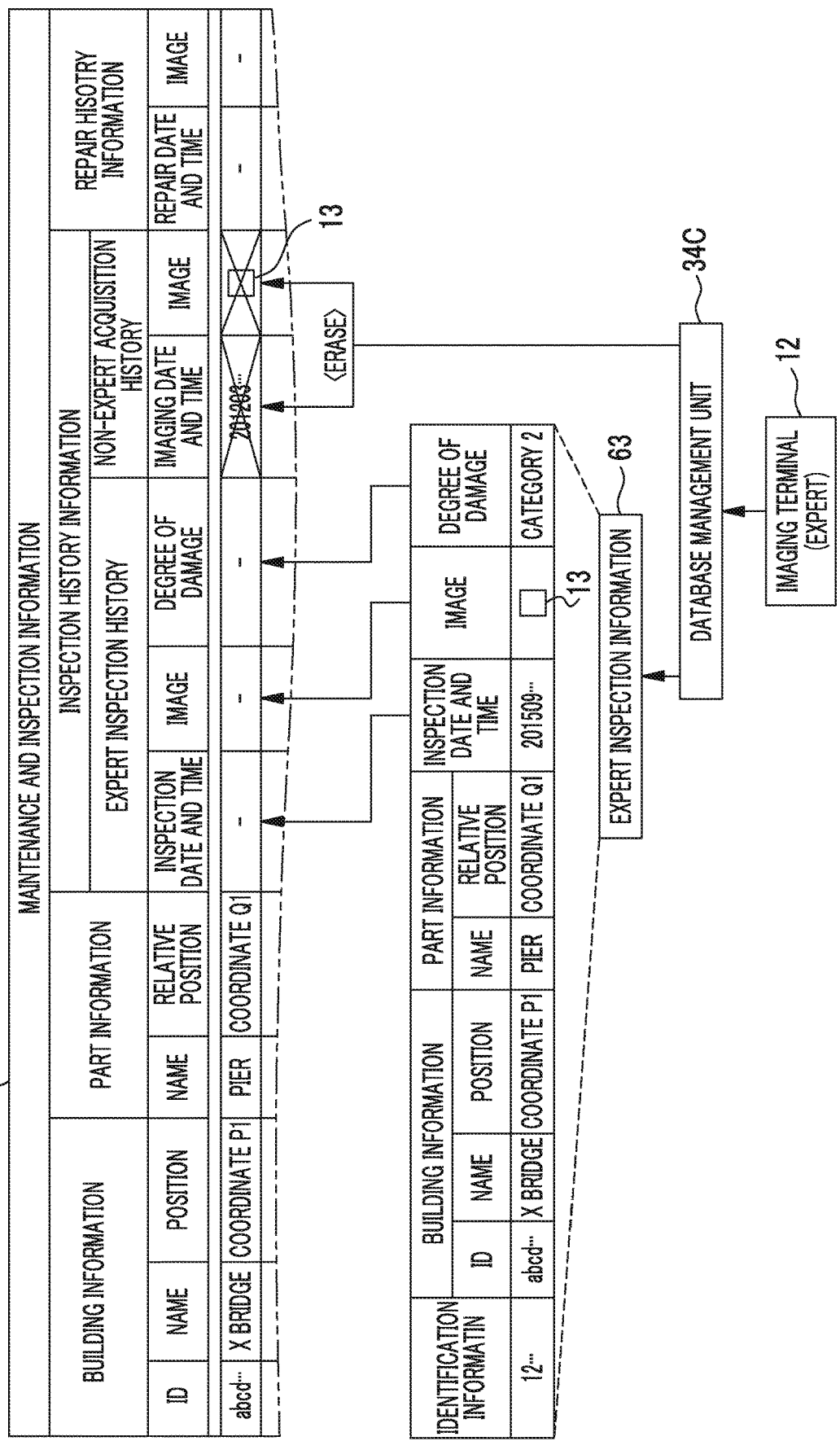
FIG. 18 is an illustrative diagram illustrating a process of registering expert inspection information in a database management unit of the fourth embodiment.

FIG. 18 is an illustrative diagram illustrating a registration process of the expert inspection information 63 in the database management unit 34 C of the fourth embodiment. As illustrated in FIG. 18, in a case where the "identification information" included in the expert inspection information 63 is registered in a list (not illustrated) of expert identification information created in advance, the database management unit 34C registers the expert inspection information 63 in the corresponding maintenance and inspection information 38 in the database 16.

Specifically, the database management unit 34C accesses the database 16 and registers the "Inspection date and time", the "Captured image data 13", and the "Degree of damage" of the expert inspection information 63 in the "Expert inspection history" of the maintenance and inspection information 38 corresponding to the "Building information" and the "Part information" of the expert inspection information 63.

Further, in a case where the database management unit 34C performs registration of the expert inspection information 63, the database management unit 34C erases information such as the captured image data 13 registered in the "Non-expert acquisition history" in a case where the captured image data 13 or the like is registered in the "Non-expert acquisition history" of the maintenance and inspection information 38 that is a registration target.

[Effects of Fourth Embodiment]

As described above, in the imaging support system 10C of the fourth embodiment, in a case where the captured image data 13 of the image acquisition area 17 imaged by the expert is registered in the maintenance and inspection information 38 in the database 16, the captured image data 13 of the "Non-expert acquisition history" registered in the corresponding maintenance and inspection information 38, or the like is erased. Thus, it is possible to reduce the amount of data registered in the database 16.

[Others]

Although the database 16 is provided separately from the imaging support device 14 or the like in each of the above embodiments, the database 16 may be embedded into the imaging support device 14 or the like.

Although the building is taken as an example of an inspection target of the present invention in each of the above-described embodiments, an object that can be a target of various inspection (including management), such as a natural object such as a tree, an artifact other than a building, or a site at which a disaster such as landslide or an accident has occurred, may also be included in the inspection target of the present invention.

A program for causing a computer to function as the imaging support device described in each of the above embodiments can be recorded on a compact disc read only memory (CD-ROM), a magnetic disk, or another computer readable medium (a tangible non-transitory information storage medium), and the program can be provided through the information storage medium. Further, it is also possible to provide a program as a download service using a communication network such as the Internet, instead of an aspect in which the program is stored in and provided through the information storage medium.

EXPLANATION OF REFERENCES

9: surrounding building
10, 10B, 10C: imaging support system
12, 12B: imaging terminal
13: captured image data
14, 14A to 14C: imaging support device
15, 15A1, 15B: specifying information
16: database
17: image acquisition area
17A, 17B: image acquisition area information
20: position information acquisition unit
21: imaging direction acquisition unit
22: imaging unit
30, 30A1, 30B: specifying information acquisition unit
31, 31A, 31A1, 31B: building specifying unit
32, 32A, 32B: necessity evaluation unit
33, 33B: image acquisition area information output unit
34, 34C: database management unit
36: map information
38: maintenance and inspection information
41, 41B: specifying information output unit
42, 42B: image acquisition area information acquisition unit
43, 43B: display control unit
44: display unit
45: image output unit
51: design information specifying unit
53: design information
58: image acquisition area display map data

What is claimed is:

1. An imaging support system comprising an imaging terminal having an imaging unit, and an imaging support device that supports imaging of an inspection target in the imaging terminal,
wherein the imaging support device comprises a first central processing unit that
acquires, from the imaging terminal, specifying information for specifying a surrounding inspection target which is an inspection target present in a predetermined range with respect to the imaging terminal, specifies the surrounding inspection target among the plurality of inspection targets on the basis of the specifying information acquired, evaluates whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target specified, and outputs image acquisition area information indicating the image acquisition area evaluated that the acquisition of a new captured image is necessary to the imaging terminal, wherein the imaging terminal further comprises a position information acquisition sensor, a second central processing unit and a display unit, wherein the position information acquisition sensor acquires a position information of an imaging terminal, the second central processing unit outputs the specifying information which include the position information of the imaging terminal acquired by the position information acquisition sensor to the first central processing unit, the display unit displays the image acquisition area on the basis of the image acquisition area information output from the first central processing unit, the first central processing unit acquires the position information of the inspection target indicating positions of the plurality of inspection targets, and specifies the surrounding inspection target on the basis of the inspection target information and the position information of the imaging terminal included in the specifying information acquired, the second central processing unit outputs the captured image of the image acquisition area to the imaging support device in a case where the imaging unit images the image acquisition area, the first central processing unit registers the captured image output from the second central processing unit in the database as the maintenance and inspection information of the surrounding inspection target corresponding to the image acquisition area, and in a case where the captured image output from the second central processing unit of the imaging terminal of a predetermined specific user is registered in the database, the first central processing unit erases the captured image previously registered in the database as the maintenance and inspection information of the surrounding inspection target, the captured image being acquired from the imaging terminal of a user different from the specific user.

2. The imaging support system according to claim 1, wherein the imaging terminal comprises an imaging direction acquisition sensor that acquires an imaging direction of the imaging terminal, the specifying information further includes the imaging direction acquired by the imaging direction acquisition sensor, the first central processing unit specifies the surrounding inspection target included in an imaging range of the imaging unit on the basis of the position information and the imaging direction included in the specifying information acquired, evaluates whether or not there is the image acquisition area in the imaging range of the imaging unit on the basis of a specified result of the surrounding inspection target included in the imaging range of the imaging unit, and outputs the image acquisition area information indicating the image acquisition area in the imaging range to the imaging terminal, and the display unit discriminably displays the image acquisition area on the basis of the image acquisition area information in a case where a live view image is displayed on the basis of the captured image obtained by imaging in the imaging unit.

3. The imaging support system according to claim 1, wherein the inspection target is a building, the imaging terminal comprises an imaging direction acquisition sensor that acquires an imaging direction of the imaging terminal, the specifying information further includes the imaging direction acquired by the imaging direction acquisition sensor, the first central processing unit further acquires design information of the plurality of inspection targets in advance and specifies the design information of the surrounding inspection target on the basis of the design information and the surrounding inspection target specified, specifies a part of the surrounding inspection target in the imaging range of the imaging unit on the basis of the position information and the imaging direction included in the specifying information acquired, and the design information specified, and evaluates whether or not there is the image acquisition area in the part specified on the basis of a result of accessing the database and referring to the maintenance and inspection information of the surrounding inspection target.

4. The imaging support system according to claim 1, wherein the inspection target is a building, the specifying information further includes a captured image obtained by imaging in the imaging unit, the first central processing unit further acquires design information of the plurality of inspection targets in advance and specifies the design information of the surrounding inspection target on the basis of the design information and the surrounding inspection target specified, specifies a part of the surrounding inspection target in the imaging range of the imaging unit on the basis of the position information and the captured image included in the specifying information acquired, and the design information specified, and evaluates whether or not there is the image acquisition area in the part specified on the basis of a result of accessing the database and referring to the maintenance and inspection information of the surrounding inspection target.

5. The imaging support system according to claim 3, wherein the first central processing unit outputs the image acquisition area information indicating the image acquisition area in the imaging range in which it is evaluated that acquisition of a new captured image is necessary, to the imaging terminal, and the display unit discriminably displays the image acquisition area on the basis of the image acquisition area information in a case where a live view image is displayed on the basis of the captured image obtained by imaging in the imaging unit.

6. The imaging support system according to claim 4, wherein the first central processing unit outputs the image acquisition area information indicating the image acquisition area in the imaging range in which it is evaluated that acquisition of a new captured image is necessary, to the imaging terminal, and the display unit discriminably displays the image acquisition area on the basis of the image acquisition area information in a case where a live view image is displayed on the basis of the captured image obtained by imaging in the imaging unit.

7. The imaging support system according to claim 1, wherein the image acquisition area information includes information capable of specifying a position of the image acquisition area on a map, and the display unit displays an image acquisition area display map indicating a position of the image acquisition area on the map on the basis of the image acquisition area information output from the first central processing unit.

8. An imaging support device comprising:

a first central processing unit that acquires, from an imaging terminal having an imaging unit and a second central processing unit, specifying information which include the position information of the imaging terminal for specifying a surrounding inspection target which is an inspection target present in a predetermined range with respect to the imaging terminal, specifies the surrounding inspection target among the plurality of inspection targets on the basis of the specifying information which include the position information of the imaging terminal acquired and the position information of the inspection target indicating positions of the plurality of inspection targets, evaluates whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target specified, outputs image acquisition area information indicating the image acquisition area evaluated that the acquisition of a new captured image is necessary to the imaging terminal, receives the captured image of the image acquisition area from the second central processing unit in a case where the imaging unit images the image acquisition area, registers the captured image output from the second central processing unit in the database as the maintenance and inspection information of the surrounding inspection target corresponding to the image acquisition area, and in a case where the captured image output from the second central processing unit of a predetermined specific user is registered in the database, erases the captured image previously registered in the database as the maintenance and inspection information of the surrounding inspection target, the captured image being acquired from the imaging terminal of a user different from the predetermined specific user.

9. The imaging terminal constituting the imaging support system according to claim 1.

10. An imaging support method that supports imaging of an inspection target in an imaging terminal including an imaging unit by using an imaging support device, the imaging support method comprising:

a specifying information acquisition step of acquiring, by the imaging support device, specifying information which include the position information of the imaging terminal for specifying a surrounding inspection target which is an inspection target present in a predetermined range with respect to the imaging terminal from the imaging terminal;

an inspection target specifying step of acquiring a position information of the inspection target indicating positions of the plurality of inspection targets and specifying, by the imaging support device, the surrounding inspection target among the plurality of inspection targets on the basis of the specifying information which include the position information of the imaging terminal acquired in the specifying information acquisition step and the position information of the inspection target;

a necessity evaluation step of evaluating, by the imaging support device, whether or not there is an image acquisition area in which acquisition of a new captured image is necessary for the surrounding inspection target on the basis of a result of accessing a database that stores maintenance and inspection information including at least a captured image for each of the plurality of inspection targets and referring to the maintenance and inspection information of the surrounding inspection target specified in the inspection target specifying step;

a first output step of outputting, by the imaging support device, image acquisition area information indicating the image acquisition area in which it is evaluated in the necessity evaluation step that the acquisition of a new captured image is necessary, to the imaging terminal;

a display step of displaying, by the imaging terminal, the image acquisition area on the display unit on the basis of the image acquisition area information acquired from the imaging support device in the image acquisition area information output step;

a second output step of outputting, by the imaging terminal, the captured image of the image acquisition area to the imaging support device in a case where the imaging unit images the image acquisition area;

a register step of registering, by the imaging support device, the captured image output by the second output step in the database as the maintenance and inspection information of the surrounding inspection target corresponding to the image acquisition area; and in a case where the captured image output from the imaging terminal of a predetermined specific user is registered in the database, an erasing step of erasing, by the imaging support device, the captured image previously registered in the database as the maintenance and inspection information of the surrounding inspection target, the captured image being acquired from the imaging terminal of a user different from the predetermined specific user.

* * * * *